United States Patent
Umeyama et al.

(10) Patent No.: US 10,224,564 B2
(45) Date of Patent: Mar. 5, 2019

(54) NONAQUEOUS ELECTROLYTE SECONDARY BATTERY AND BATTERY PACK

(71) Applicant: TOYOTA JIDOSHA KABUSHIKI KAISHA, Toyota-shi, Aichi-ken (JP)

(72) Inventors: Hiroya Umeyama, Okazaki (JP); Yukiyoshi Ueno, Gotenba (JP); Hideki Sano, Ikeda (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 245 days.

(21) Appl. No.: 15/187,036

(22) Filed: Jun. 20, 2016

(65) Prior Publication Data
US 2016/0380299 A1    Dec. 29, 2016

(30) Foreign Application Priority Data

Jun. 25, 2015 (JP) ................................. 2015-127719

(51) Int. Cl.
| | |
|---|---|
| *H01M 10/0587* | (2010.01) |
| *H01M 10/04* | (2006.01) |
| *H01M 4/505* | (2010.01) |
| *H01M 4/525* | (2010.01) |
| *H01M 10/052* | (2010.01) |

(52) U.S. Cl.
CPC ....... *H01M 10/0431* (2013.01); *H01M 4/505* (2013.01); *H01M 4/525* (2013.01); *H01M 10/052* (2013.01); *H01M 10/0587* (2013.01); *Y02T 10/7011* (2013.01)

(58) Field of Classification Search
CPC .................... H01M 10/0431; H01M 10/0587
USPC .......................................................... 429/94
See application file for complete search history.

(56) References Cited

U.S. PATENT DOCUMENTS

| | | | |
|---|---|---|---|
| 2009/0202900 A1 | 8/2009 | Kuroda et al. | |
| 2015/0263376 A1* | 9/2015 | Kondo .............. | H01M 10/0431 429/94 |

FOREIGN PATENT DOCUMENTS

| | | |
|---|---|---|
| JP | 2001-273881 A | 10/2001 |
| JP | 2005-327550 A | 11/2005 |
| JP | 2005-339930 A | 12/2005 |
| JP | 2007-335165 A | 12/2007 |
| JP | 2008-078008 A | 4/2008 |
| JP | 2009-266750 A | 11/2009 |
| WO | WO 2014/024019 * 2/2014 | .............. H01M 2/20 |

* cited by examiner

*Primary Examiner* — James Lee
(74) *Attorney, Agent, or Firm* — Sughrue Mion, PLLC

(57) ABSTRACT

A nonaqueous electrolyte secondary battery includes a wound electrode body, and the wound electrode body includes two curved portions and a center flat portion which has flat surfaces. A positive electrode winding end, a negative electrode winding end, and separator winding ends are positioned on the same curved portion. The negative electrode winding end is arranged at an advanced position from the positive electrode winding end in a winding direction, and at least one of the separator winding ends is positioned at an advanced position from the negative electrode winding end in the winding direction. A distance a (mm) from the negative electrode winding end to the separator winding end and a distance b (mm) from the positive electrode winding end to the negative electrode winding end satisfy relationships $0.5 \leq a \times (a+b) \leq 104$ and $0 \leq b \leq 11$.

7 Claims, 9 Drawing Sheets

NONAQUEOUS ELECTROLYTE SECONDARY BATTERY AND BATTERY PACK

INCORPORATION BY REFERENCE

The disclosure of Japanese Patent Application No. 2015-127719 filed on Jun. 25, 2015 including the specification, drawings and abstract is incorporated herein by reference in its entirety.

BACKGROUND OF THE INVENTION

1. Field of the Invention

The present invention relates to a nonaqueous electrolyte secondary battery.

2. Description of Related Art

Recently, a nonaqueous electrolyte secondary battery such as a lithium ion secondary battery (lithium secondary battery) or a sodium ion secondary battery has been used as a so-called portable power supply for a PC, a portable device, or the like or as a drive power supply for a vehicle. In particular, a light-weight lithium ion secondary battery capable of obtaining high energy density is preferably used as a high-output power supply for driving a vehicle such as an electric vehicle (EV), a hybrid vehicle (HV), or a plug-in hybrid vehicle (PHV).

Typically, the nonaqueous electrolyte secondary battery includes an electrode body and a nonaqueous electrolytic solution. Examples of a configuration example of the electrode body included in the battery include a wound electrode body that is obtained by winding an elongated sheet-shaped positive electrode, an elongated sheet-shaped negative electrode, and an elongated sheet-shaped separator into a flat shape. Typically, the wound electrode body includes: two curved portions that are both end portions in a direction perpendicular to a winding axis and in which an outer surface excluding a lamination surface of the wound electrode body is curved; and a center flat portion that is a center portion interposed between the curved portions and has wide flat surfaces.

However, in a case where the above-described nonaqueous electrolyte secondary battery is mounted on a vehicle such as an automobile, it is assumed that a mounting space is limited and that the nonaqueous electrolyte secondary battery is used in a state where a vibration is generated. Therefore, in general, the nonaqueous electrolyte secondary battery is used in a state where plural batteries are arranged and restrained (a so-called battery pack). At this time, a considerable load is applied to each of the batteries.

Here, in a portion of the wound electrode body having the above-described configuration where an end portion (winding end portion) of the positive electrode, the negative electrode, or the separator is arranged, a step difference derived from the end portion may be formed. When the above-described pressure is applied to the portion of the wound electrode body where the step difference is formed, there may be a difference between a pressure applied to the step difference portion and a pressure applied to a peripheral portion around the step difference portion. A deviation in the pressure applied to the wound electrode body may cause deterioration in battery performance (for example, input and output characteristics or cycle characteristics). As one of the methods for reducing the non-uniformity in the pressure applied to the wound electrode body, Japanese Patent Application Publication No. 2008-078008 (JP 2008-078008 A) discloses a technique in which the end (winding end portion) of the positive electrode, the negative electrode, or the separator is arranged at the curved portion of the wound electrode body.

SUMMARY OF THE INVENTION

However, according to the investigation by the present inventors, by arranging the end portion (winding end portion) of the positive electrode, the negative electrode, or the separator at the curved portion of the wound electrode body, the deviation in the pressure applied to the wound electrode body can be reduced; however, depending on the structure of the electrode body, small short-circuiting may occur during an aging treatment (typically, high-temperature aging) in the manufacturing of a nonaqueous electrolyte secondary battery. The present invention provides a nonaqueous electrolyte secondary battery in which the deviation in the pressure applied to the wound electrode body and the occurrence of small short-circuiting can be reduced.

The present inventors repeated a detailed investigation on a state where small short-circuiting occurs when a nonaqueous electrolyte secondary battery including a wound electrode body is stored for a long period of time (that is, aging treatment; typically, high-temperature aging) during charging. It was found that the small short-circuiting is likely to occur between a negative electrode, which is positioned on the outermost circumference side, and a positive electrode facing the negative electrode in a wound electrode body that is wound such that the negative electrode is positioned on the outer circumference side of the wound electrode body compared to the positive electrode, in which a positive electrode active material layer and a negative electrode active material layer are formed on each of both surfaces of a positive electrode current collector in a longitudinal direction and on each of both surfaces of a negative electrode current collector in the longitudinal direction, respectively, so as to reach a positive electrode winding end and a negative electrode winding end which are winding ends of the positive electrode and the negative electrode and are positioned outside the wound electrode body. More specifically, it was found that, in the positive electrode and the negative electrode which are positioned on the outermost circumference side of the wound electrode body, the small short-circuiting is likely to occur in portions thereof where surplus portions of separators, which are present in the vicinity of winding ends of the separators in the winding direction and do not contact the positive electrode and the negative electrode, are laminated. Hereinafter, unless specified otherwise, "high temperature" refers to a temperature range of about 45° C. or higher (typically, 60° C. or higher). Hereinafter, the negative electrode which is positioned on the outermost circumference side of the wound electrode body will be referred to as "outermost circumferential negative electrode". The surplus portions of the separators, which are present in the vicinity of winding ends of the separators in the winding direction and do not contact the positive electrode and the negative electrode, will also be referred to as "surplus separator regions".

The finding obtained by the present inventors on the reason why the small short-circuiting occurs will be described appropriately with reference to the drawing (FIG. 8). FIG. 8 schematically shows the movement of charge carriers to the outermost circumferential negative electrode. In the drawing, "Li+" represents charge carriers (typically, lithium ions), and arrows represent a movement direction of the charge carriers. In FIG. 8, for easy understanding of the movement of charge carriers between the positive electrode and the negative electrode, members ((for example, the separators) other than the positive electrode and the negative electrode are not shown. As shown in FIG. 8, in general, during the charging of the battery, charge carriers move from a positive electrode active material layer 54 to a negative electrode active material layer 64 facing the positive electrode active material layer 54. When charge carriers are excessively extracted from a local portion of the positive electrode active material layer 54, the potential of the portion where the charge carriers are excessively extracted increases to be higher than the other portions. A positive electrode active material present in the high-potential portion of the positive electrode active material layer 54 is likely to be unstable. When an aging treatment (typically, a high-temperature aging treatment) is performed in this state, a metal component constituting the positive electrode active material is eluted from the unstable positive electrode active material and is deposited on the surface of the negative electrode 60 facing the positive electrode active material layer 54. The metal deposited on the surface of the negative electrode 60 may cause the small short-circuiting.

As shown in FIG. 8, in the wound electrode body in which the negative electrode 60 is positioned on the outer circumference compared to the positive electrode 50, in an outermost circumferential negative electrode 60*a*, the positive electrode active material layer 54 facing a negative electrode active material layer 64*b* on the winding inner circumference side of a negative electrode current collector 62 is present, but the positive electrode active material layer 54 facing a negative electrode active material layer 64*a* on the winding outer circumference side of the negative electrode current collector 62 is not present. Therefore, during charging, in the outermost circumferential negative electrode 60*a*, as shown in the drawing, in an end portion of the negative electrode 60 in a width direction perpendicular to the longitudinal direction (that is in a winding axial direction of the wound electrode body), charge carriers in the negative electrode active material layer 64*b* on the winding inner circumference side may move to the negative electrode active material layer 64*a* on the winding outer circumference side. In addition, the charge carriers which have moved to the negative electrode active material layer 64*a* on the winding outer circumference side are diffused (move) in the negative electrode active material layer 64*a* on the winding outer circumference side in the width direction perpendicular to the longitudinal direction of the negative electrode 60 (that is, in the winding axial direction of the wound electrode body). At this time, in the positive electrode active material layer 54 which faces the outermost circumferential negative electrode 60*a* (typically, the negative electrode active material layer 64*b* on the winding inner circumference side of the outermost circumferential negative electrode 60*a*), charge carriers are extracted not only to the negative electrode active material layer 64*b* on the winding inner circumference side, which faces the positive electrode active material layer 54, but also to the negative electrode active material layer 64*a* on the winding outer circumference side. As a result, charge carrier may be excessively desorbed. In particular, charge carriers are likely to be excessively desorbed from an end portion of the positive electrode active material layer 54 which faces the outermost circumferential negative electrode 60*a* (that is, the negative electrode active material layer 64*b* on the winding inner circumference side) and is an end portion in a width direction perpendicular to the longitudinal direction of the positive electrode 50 (that is, in the winding axial direction of the wound electrode body).

It is necessary that a nonaqueous electrolytic solution is impregnated into the negative electrode active material layer 64*a* on the winding outer circumference side for the movement of charge carriers from the negative electrode active material layer 64*b* on the winding inner circumference side to the negative electrode active material layer 64*a* on the winding outer circumference side in the end portion of the outermost circumferential negative electrode 60*a* in the width direction (that is, in the winding axial direction of the wound electrode body) and for the diffusion of charge carriers in the negative electrode active material layer 64*a* on the winding outer circumference side. In a case where separator winding ends, which are winding ends of two separators and are positioned outside the wound electrode body, are arranged at advanced positions in the winding direction from the positive electrode winding end of the positive electrode and the negative electrode winding end of the negative electrode which are positioned outside the wound electrode body, the surplus separator regions which do not contact the positive electrode 50 and the negative electrode 60 are present in the vicinity of the winding ends of the separators. In a portion of the outermost circumferential negative electrode 60*a* where the surplus separator regions are laminated, a surplus amount of a nonaqueous electrolytic solution impregnated into the surplus separator regions is present on the outside of the negative electrode active material layer 64*a* on the winding outer circumference side. Therefore, a larger amount of charge carriers are extracted from the positive electrode active material layer 54 which faces the portion of the outermost circumferential negative electrode 60*a* where the surplus separator regions are laminated. In particular, charge carriers are excessively extracted from a local portion of the positive electrode active material layer 54 which is an end portion in the width direction perpendicular to the longitudinal direction of the positive electrode 50 (that is, the winding axial direction of the wound electrode body) and faces the portion of the outermost circumferential negative electrode 60*a* where the surplus separator regions are laminated.

From the viewpoint of securing the insulating properties between the positive electrode and the negative electrode or the insulating properties between the wound electrode body (typically, the outermost circumferential negative electrode) and the battery case, it is preferable that the separator is positioned on the outermost circumference of the wound electrode body (that is, the surface of the negative electrode which is positioned on the outermost circumference side of the wound electrode body is covered with the separator). Therefore, the size of the separators (the length in the longitudinal direction) is typically set to be a size including a tolerance in consideration of a variation in the process of manufacturing the wound electrode body (a size in which the winding ends of the separators are arranged at advanced positions from the winding ends of the positive electrode and the negative electrode in the winding direction). Accordingly, there is a limit in the reduction of the area of the surplus separator regions.

According to the invention, there is provided a nonaqueous electrolyte secondary battery including a wound electrode body, in which the wound electrode body is a flat wound electrode body that is obtained by laminating an elongated positive electrode and an elongated negative electrode with two elongated separators interposed between the elongated positive electrode and the elongated negative electrode to obtain a laminate and winding the laminate, the positive electrode includes a positive electrode active material layer on a positive electrode current collector, and the negative electrode includes a negative electrode active material layer on a negative electrode current collector. In the nonaqueous electrolyte secondary battery, the positive electrode active material layer is formed on each of both surfaces of the positive electrode current collector in a longitudinal direction so as to reach a positive electrode winding end which is a winding end of the elongated positive electrode constituting the wound electrode body and the positive electrode winding end is positioned outside the wound electrode body. The negative electrode active material layer is formed on each of both surfaces of the negative electrode current collector in a longitudinal direction so as to reach a negative electrode winding end which is a winding end of the elongated negative electrode constituting the wound electrode body and the negative electrode winding end is positioned outside the wound electrode body. The wound electrode body is formed such that the negative electrode is positioned on an outer circumference side of the wound electrode body compared to the positive electrode, and has two curved portions and a center flat portion, the two curved portions are both end portions in a direction perpendicular to a winding axis and in which an outer surface excluding a lamination surface of the wound electrode body is curved, and the center flat portion is a center portion interposed between the curved portions and has two wide flat surfaces. The positive electrode winding end of the positive electrode, the negative electrode winding end of the negative electrode, and separator winding ends are arranged on the same curved portion to be positioned inside the two flat surfaces in a thickness direction of the wound electrode body, and the separator winding ends are winding ends of the two separators, respectively, and the separator winding ends are positioned outside the wound electrode body, (hereinafter, also simply referred to as "positive electrode winding end", "negative electrode winding end", and separator winding ends", respectively). The arrangement of the positive electrode winding end, the negative electrode winding end, and the two separator winding ends satisfies conditions (i) and (ii): (i) the negative electrode winding end is arranged at a position where the negative electrode winding end is parallel to the positive electrode winding end, or at an advanced position from the positive electrode winding end in a winding direction; and (ii) at least one of the separator winding ends is positioned at an advanced position from the negative electrode winding end in the winding direction. When a distance from the negative electrode winding end to one of the two separator winding ends which is arranged at a more advanced position in the winding direction is represented by a (mm), and when a distance from the positive electrode winding end to the negative electrode winding end is represented by b (mm), the distance a and the distance b satisfy relationships $0.5 \leq a \times (a+b) \leq 104$ and $0 \leq b \leq 11$.

In this specification, "nonaqueous electrolyte secondary battery" refers to secondary batteries including a nonaqueous electrolytic solution (typically, a nonaqueous electrolytic solution containing a supporting electrolyte in a nonaqueous solvent (organic solvent)). Here, "secondary battery" is a collective term for general batteries which can be repeatedly charged and discharged and is a collective term for so-called chemical batteries such as a lithium ion secondary battery and so-called physical batteries such as an electric double layer capacitor.

According to the above-described configuration, the positive electrode winding end, the negative electrode winding end, and the separator winding ends are arranged on the curved portion and are positioned inside the two flat surfaces in the thickness direction of the wound electrode body. Therefore, a step difference derived from the respective winding ends is not formed on the flat surfaces of the wound electrode body. Therefore, in a case where the center flat portion of the wound electrode body is pressed in a direction perpendicular to the flat surfaces of the center flat portion, the deviation in the pressure applied to the wound electrode body is not likely to be generated.

In the nonaqueous electrolyte secondary battery having the above-described configuration, when the separator winding ends of the separators are arranged at advanced positions from the negative electrode winding end in the winding direction, portions of the separators at the advanced positions are the surplus portions (that is, the surplus separator regions) which do not contact the positive electrode and the negative electrode. As the distance b decreases, the distance between the positive electrode winding end and the surplus separator regions is reduced. Therefore, charge carriers are easily supplied from the positive electrode winding end to the portion of the negative electrode active material layer on the winding outer circumference side of the negative electrode (that is, the outermost circumferential negative electrode), which is positioned on the outermost circumference side of the wound electrode body, where the surplus separator regions are laminated. As the distance a decreases, the portion of the negative electrode active material layer on the winding outer circumference side of the outermost circumferential negative electrode where the surplus separator regions are laminated is narrowed. Therefore, the amount of charge carriers moving to the negative electrode active material layer on the winding outer circumference side of the outermost circumferential negative electrode can be reduced. According to the investigation by the present inventors, in a case where the distance a and the distance b satisfy the above-described relationship, the excessive desorption of charge carriers from the positive electrode active material layer which faces the portion of the outermost circumferential negative electrode where the surplus separator regions are laminated can be suppressed.

As described above, according to the above-described configuration, a nonaqueous electrolyte secondary battery can be provided in which, in a case where the center flat portion of the wound electrode body is pressed in a direction perpendicular to the flat surfaces of the center flat portion, the deviation in the pressure applied to the wound electrode body and the occurrence of small short-circuiting can be reduced.

In a preferable aspect of the nonaqueous electrolyte secondary battery disclosed herein, the distance a (mm) and the distance b (mm) satisfy $0.5 \leq a \leq 8$ and $0.5 \leq b \leq 11$. It is preferable that the distance a (mm) and the distance b (mm) satisfy $0.5 \leq a \times (a+b) \leq 50$. By controlling the distance a and the distance b to be in the above-described range, the occurrence of small short-circuiting can be significantly suppressed.

In a preferable aspect of the nonaqueous electrolyte secondary battery disclosed herein, the one of the two separator winding ends which is arranged at a more advanced position in the winding direction is fixed to an outer surface of the wound electrode body through a winding stopper, and both ends of the winding stopper in the winding direction are arranged on the same curved portion as the separator winding ends to be positioned inside the two flat surfaces in the thickness direction of the wound electrode body. The winding stopper may be the reason for the formation of a step difference on the surface of the wound electrode body as in the case of the positive electrode winding end, the negative electrode winding end, and the separator winding ends. According to the above-described configuration, a step difference derived from the winding stopper is not formed on the flat surfaces of the wound electrode body. Therefore, even in a case where the center flat portion of the wound electrode body is pressed in a direction perpendicular to the flat surfaces of the center flat portion, the deviation in the pressure applied to the wound electrode body is not likely to be generated.

In a preferable aspect of the nonaqueous electrolyte secondary battery disclosed herein, the separator winding ends of the two separators may be arranged at positions parallel to each other. According to the above-described configuration, three separators are present in the above-described surplus separator regions, and thus a large amount of the nonaqueous electrolytic solution is stored. In the nonaqueous electrolyte secondary battery according to the invention, the excessive desorption of charge carriers from the positive electrode active material layer which faces the portion of the outermost circumferential negative electrode where the surplus separator regions are laminated can be suppressed. Therefore, even in a case where the separator winding ends of the two separators are aligned, the occurrence of small short-circuiting can be significantly suppressed.

In a preferable aspect of the nonaqueous electrolyte secondary battery disclosed herein, the positive electrode active material layer may contain, as a positive electrode active material, a lithium transition metal composite oxide containing at least one of manganese and nickel. In the nonaqueous electrolyte secondary battery according to the invention, the excessive desorption of charge carriers from the positive electrode active material layer which faces the outermost circumferential negative electrode can be suppressed. Even in a case where the lithium transition metal composite oxide is used as a positive electrode active material, a metal component constituting the positive electrode active material is not likely to be eluted. That is, even in a case where the positive electrode active material is used, the occurrence of small short-circuiting can be significantly suppressed.

According to the invention, there is provided a battery pack in which plural single cells are electrically connected to each other. The battery pack includes one of the nonaqueous electrolyte secondary batteries disclosed herein as each of the single cells. The center flat portion of the wound electrode body included in the single cell is pressed at a pressure of 0.2 MPa to 10 MPa in a direction perpendicular to the flat surfaces of the center flat portion. In the nonaqueous electrolyte secondary battery disclosed herein, a step difference derived from the respective winding ends and the like is not formed on the flat surfaces of the center flat portion of the wound electrode body. Therefore, even in a case where the center flat portion of the wound electrode body is pressed in a direction perpendicular to the flat surfaces of the center flat portion, the deviation in the pressure applied to the wound electrode body is not likely to be generated. Accordingly, by using the nonaqueous electrolyte secondary battery as the single cell constituting the battery pack having the above-described configuration, satisfactory battery characteristics (for example, input and output characteristics or cycle characteristics) can be exhibited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
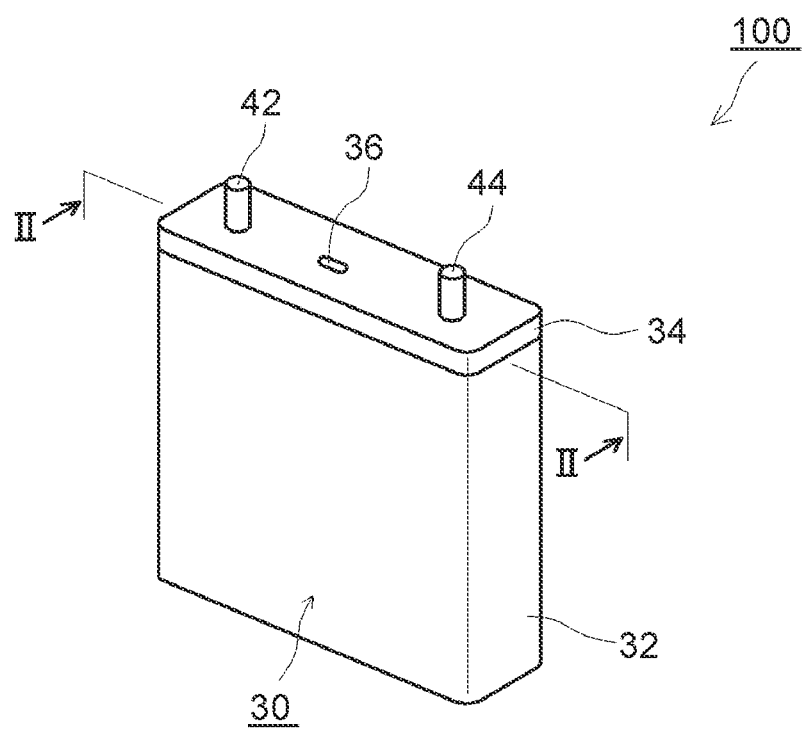
FIG. 1 is a perspective view schematically showing the external appearance of a nonaqueous electrolyte secondary battery according to an embodiment of the invention.

Hereinafter, a lithium ion secondary battery according to a preferable embodiment of the invention will be described as an example while appropriately referring to the drawings. Matters necessary to implement the embodiments of the invention other than those specifically referred to in the invention may be understood as design matters based on the related art in the pertinent field for a person of ordinary skill in the art. The invention can be practiced based on the contents disclosed in this specification and common technical knowledge in the pertinent field. In addition, in the following drawings, parts or portions having the same function are represented by the same reference numerals, and the repeated description thereof will not be made or will be simplified. In each drawing, a dimensional relationship (for example, length, width, or thickness) does not necessarily reflect the actual dimensional relationship. The lithium ion secondary battery is an example, and the technical idea of the invention is not limited thereto. For example, various secondary batteries, which can be repeatedly charged and discharged by charges moving along with the movement of charge carriers between positive and negative electrodes, can be used as application targets. Specifically, the technical idea of the invention can be applied to not also a lithium ion secondary battery in which lithium ions are used as charge carriers but also other secondary batteries (for example, a sodium ion secondary battery) including other charge carriers (for example, sodium ions).

Figure 2:
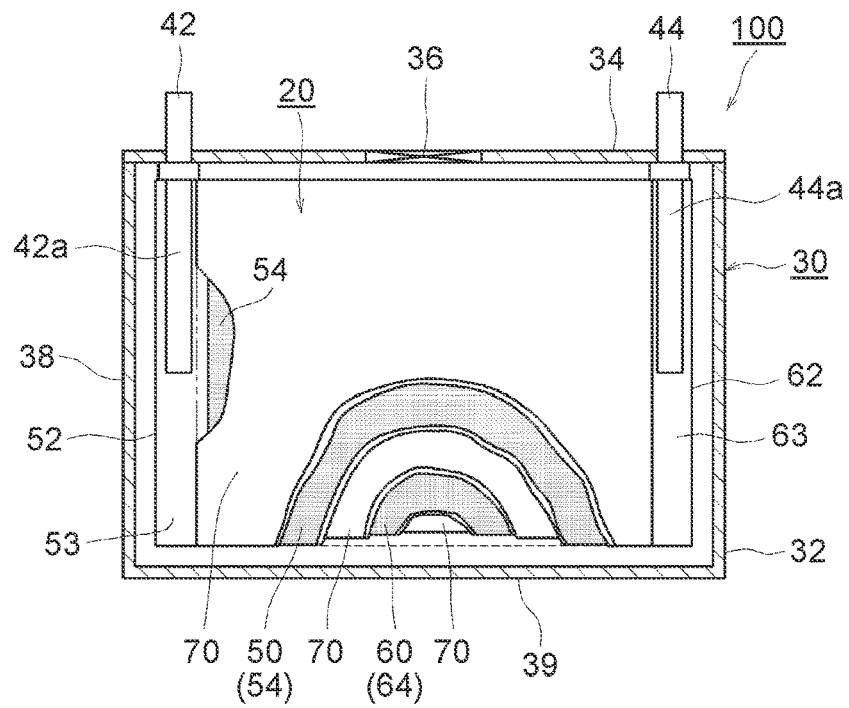
FIG. 2 is a diagram schematically showing a sectional structure taken along line II-II of FIG. 1.
Figure 3:
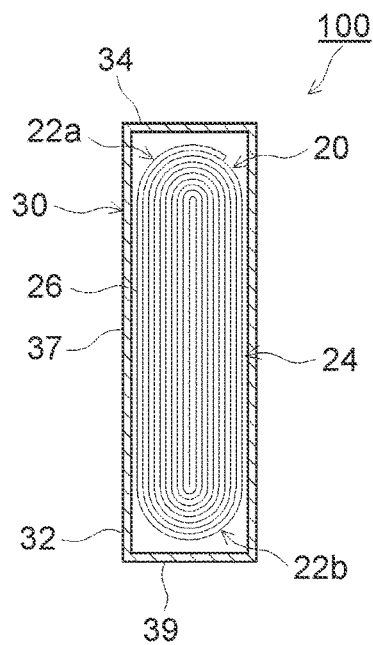
FIG. 3 is a longitudinal sectional view schematically showing an electrode body that is accommodated in a battery case regarding the nonaqueous electrolyte secondary battery according to the embodiment of the invention.

In a lithium ion secondary battery 100 disclosed herein, briefly, as shown in FIGS. 1 to 3, a flat wound electrode body 20 and an electrolytic solution (not shown) are accommodated in a battery case (that is, an external case) 30. The battery case 30 includes: a box-shaped (that is, a bottomed rectangular parallelepiped-shaped) case body 32 having an opening at an end (corresponding to an upper end in a normal operating state of the battery); and a lid 34 that seals the opening of the case body 32. The case body 32 can accommodate the wound electrode body 20 through the upper opening. As shown in FIGS. 1 to 3, the case body 32 includes: a pair of wide side surfaces 37; a pair of narrow side surfaces 38 that are adjacent to the wide side surfaces 37; and a bottom surface 39. As shown in the drawings, on the lid 34, a positive electrode terminal 42 and a negative electrode terminal 44 are provided for external connection such that portions of the terminals protrude from the lid 34 to the outside of the battery 100. Further, a safety valve 36 for discharging gas, which is produced from the inside of the battery case 30, to the outside of the battery case 30 and an injection hole (not shown) for injecting the electrolytic solution into the battery case are provided on the lid 34. It is preferable that a material of the battery case 30 is a metal material (formed of an alloy) such as aluminum, an aluminum alloy, or stainless steel, or a resin material.

The nonaqueous electrolyte secondary battery (lithium ion secondary battery) 100 having the above-described configuration can be constructed as follows. For example, the wound electrode body 20 is accommodated in the battery case 30 through the opening of the case body 32, the lid 34 is attached to the opening of the case body 32, the nonaqueous electrolytic solution is injected into the battery case 30 through an injection hole provided on the lid 34, and the injection hole is sealed with a predetermined sealing member. As a result, the nonaqueous electrolyte secondary battery 100 is constructed.

Next, a preferable embodiment of the wound electrode body 20 according to the embodiment will be described in detail with reference to the drawings.

Figure 4:
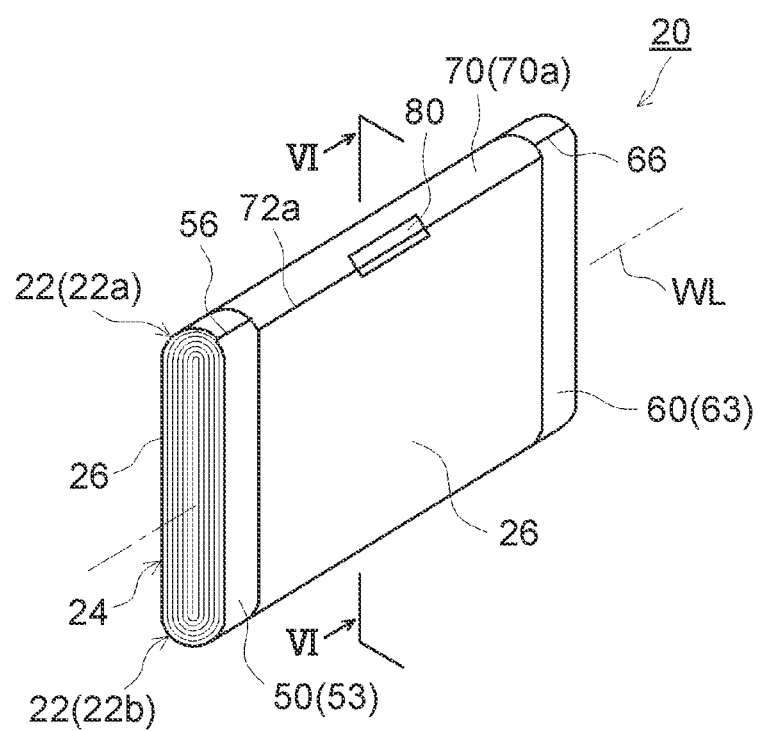
FIG. 4 is a perspective view schematically showing a configuration of a wound electrode body according to the embodiment.

As shown in FIG. 4, the wound electrode body 20 has a flat shape and includes: two curved portions 22 (22a, 22b) that are both end portions in a direction perpendicular to a winding axial direction and in which an outer surface excluding a lamination surface of the wound electrode body 20 is curved; and a center flat portion 24 that is a center portion interposed between the curved portions and has two wide flat surfaces 26.

Although not particularly limited thereto, as shown in FIGS. 2 and 3, the wound electrode body 20 according to the embodiment is accommodated in the battery case 30 (that is, the case body 32) such that a direction perpendicular to the winding axial direction is a vertical direction of the battery case 30 (case body 32) (in a posture in which the winding axis WL of the wound electrode body 20 lies sideways, that is, the opening of the case body 32 is formed in the normal direction of the winding axis WL of the wound electrode body 20) and such that the curved portion 22b of the two curved portions 22 (22a, 22b) faces the bottom surface 39 of the battery case 30. Hereinafter, the curved portion 22b of the wound electrode body 20 which faces the bottom surface 39 of the battery case will also referred to as "lower curved portion", and the other curved portion 22a, that is, the curved portion 22a on the opening side of the battery case 30 will also be referred to as "upper curved portion". In the wound electrode body shown in the drawings, the upper curved portion faces upward.

Figure 5:
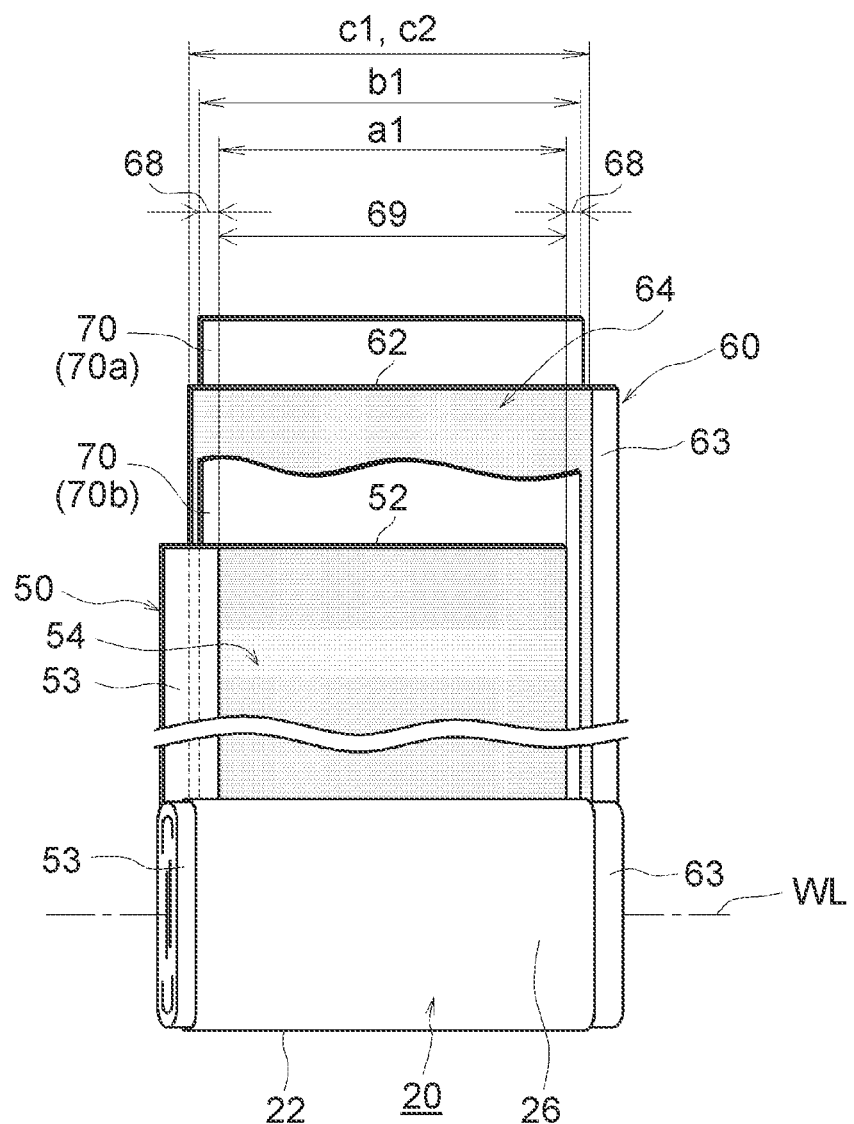
FIG. 5 is a schematic diagram showing the configuration of the wound electrode body according to the embodiment.

As shown in FIG. 5, the wound electrode body 20 has an elongated sheet structure (sheet-shaped electrode body) in a step before assembly. In the wound electrode body 20, an elongated sheet-shaped positive electrode 50 and an elongated sheet-shaped negative electrode 60 are laminated and wound with two elongated sheet-shaped separators 70 (70a, 70b). In the wound electrode body 20, from the viewpoint of the acceptability of charge carriers, the positive electrode 50, the negative electrode 60, and the separators 70 (70a, 70b) are laminated and wound such that the negative electrode 60 is positioned on an outer circumference side of the wound electrode body 20 compared to the positive electrode 50. From the viewpoint of reliably insulating the surface of the wound electrode body 20 and the inner wall of the battery case 30 from each other, it is preferable that, as shown in FIG. 4, the separator 70 (70a) is positioned on the outermost circumference of the wound electrode body 20 (that is, the negative electrode 60 which is positioned on the outermost circumference side of the wound electrode body 20 is covered with the separator 70 (70a)).

For example, the flat wound electrode body 20 can be formed, for example, by winding the positive electrode 50, the negative electrode 60, and the separators 70 (70a, 70b) around a core having a flat section perpendicular to the winding axial direction to obtain a laminate and winding the laminate, or by winding the laminate into a cylindrical shape and then pressing the wound body from a side surface direction to be squashed in a flat shape.

In the positive electrode 50, as shown in FIG. 5, a positive electrode active material layer 54 is formed on each of both surfaces of an elongated sheet-shaped positive electrode current collector 52 in a sheet longitudinal direction. In the negative electrode 60, a negative electrode active material layer 64 is formed on each of both surfaces of an elongated sheet-shaped negative electrode current collector 62 in the sheet longitudinal direction. The positive electrode active material layer 54 is formed on each of both surfaces of the positive electrode current collector 52 in the longitudinal direction so as to reach a winding end (positive electrode winding end 56) of the elongated positive electrode 50 constituting the wound electrode body 20 and the winding end is positioned outside the wound electrode body 20. The negative electrode active material layer 64 is formed on each of both surfaces of the negative electrode current collector 62 in the longitudinal direction so as to reach a winding end (negative electrode winding end 66) of the elongated negative electrode 60 constituting the wound electrode body 20 and the winding end is positioned outside the wound electrode body 20. Typically, regarding the negative electrode active material layer 64 and the positive electrode active material layer 54, in consideration of acceptability of charge carriers, as shown in the drawings, a size b1 of the negative electrode active material layer 64 in a width direction perpendicular to the longitudinal direction is larger than a size a1 of the positive electrode active material layer 54 in the width direction perpendicular to the longitudinal direction (b1>a1) in many cases. Further, in order to reliably insulate the positive electrode active material layer 54 and the negative electrode active material layer 64 from each other, sizes c1, c2 of the separators 70 (70a, 70b) in the width direction perpendicular to the longitudinal direction are larger than the sizes a1, b1 (typically, the size b1 of the negative electrode active material layer 64 in the width direction) in the width direction (typically, c1, c2>b1>a1).

As shown in FIG. 5, the positive electrode 50, the negative electrode 60, and the separators 70a, 70b are aligned in the length direction so as to be laminated in the following order: the positive electrode 50, the separator 70b, the negative electrode 60, and the separator 70a. Typically, the positive electrode 50 and the negative electrode 60 are laminated in the width direction perpendicular to the sheet longitudinal direction such that the negative electrode active material layer 64 covers the positive electrode active material layer 54. That is, typically, the positive electrode 50 and the negative electrode 60 are laminated such that both ends of the negative electrode active material layer 64 in the width direction are positioned outside, in the winding axial direction, the both ends of the positive electrode active material layer 54 in the width direction. In other words, in the both ends of the negative electrode active material layer 64 in the width direction, there may be portions which do not face the positive electrode active material layer 54 (hereinafter, simply referred to as "positive electrode active material layer non-facing portions 68"). Typically, the components are laminated such that the separators 70a, 70b cover the positive electrode active material layer 54 and the negative electrode active material layer 64 in the width direction perpendicular to the sheet longitudinal direction. That is, it is preferable that the positive electrode 50, the negative electrode 60, and the separators 70a, 70b are laminated such that both ends of the separators 70a, 70b in the width direction are positioned outside, in the winding axial direction, the both ends of the negative electrode active material layer 64 in the width direction and the both ends of the positive electrode active material layer 54 in the width direction. It is preferable that the positive electrode 50, the negative electrode 60, and the separators 70a, 70b are laminated such that the center of the positive electrode active material layer 54 in the width direction perpendicular to the longitudinal direction, the center of the negative electrode active material layer 64 in the width direction perpendicular to the longitudinal direction, and the centers of the separators 70 in the width direction perpendicular to the longitudinal direction match with each other.

During the charging of the battery, charge carriers may be diffused from the negative electrode active material layer 64, which faces the positive electrode active material layer 54 (hereinafter, simply referred to as "positive electrode active material layer facing portion 69") to the negative electrode active material layer 64 corresponding to the positive electrode active material layer non-facing portions 68 (refer to FIG. 8). Therefore, charge carriers are extracted from an end portion of the positive electrode active material layer 54 perpendicular to the longitudinal direction not only to the negative electrode active material layer 64 which faces the positive electrode active material layer (that is, the positive electrode active material layer facing portion 69) but also to the negative electrode active material layer 64 corresponding to the positive electrode active material layer non-facing portions 68. Therefore, from the viewpoint of suppressing the excessive desorption of charge carriers from the positive electrode active material layer 54, it is preferable that the area of the negative electrode active material layer 64 corresponding to the positive electrode active material layer non-facing portions 68 is small. For example, the width length of the positive electrode active material layer non-facing portion 68 (the length in a direction which matches with the width direction of the negative electrode active material layer 64) may be set in a range of, for example, 0.5 mm to 5 mm (preferably 0.5 mm to 2 mm).

Figure 8:
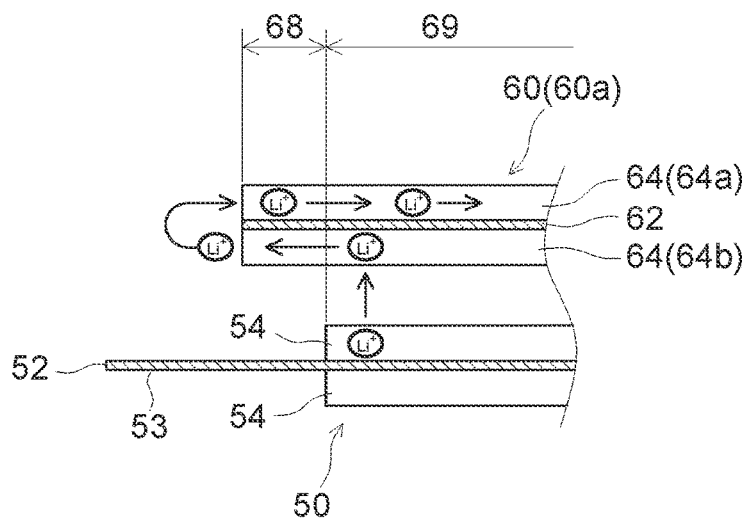
FIG. 8 is a diagram schematically showing the movement of charge carriers from a positive electrode active material layer, which faces an outermost circumferential negative electrode, and the negative electrode active material layer on a winding inner circumference side to the negative electrode active material layer on a winding outer circumference side.

In the negative electrode 60 which is positioned on the outermost circumference side of the wound electrode body 20 (that is, the outermost circumferential negative electrode 60a), as the capacity of the negative electrode active material layer 64a which is positioned on the outer circumference side of the wound electrode body 20 increases, a large amount of charge carriers are stored in the negative electrode active material layer 64a (refer to FIG. 8). That is, the outermost circumferential negative electrode 60a has a high capacity to store charge carriers which have been moved from the end portion of the negative electrode active material layer 64b, which is positioned on the inner circumference side of the wound electrode body 20, in the width direction. That is, in the outermost circumferential negative electrode 60a, as the capacity of the negative electrode active material layer 64a which is positioned on the outer circumference side of the wound electrode body 20 increases, charge carriers are more likely to be excessively desorbed from the positive electrode active material layer 54 which faces the outermost circumferential negative electrode 60a (specifically, the negative electrode active material layer 64b on the winding inner circumference side of the negative electrode) and is positioned in the end portion of the positive electrode in the width direction perpendicular to the longitudinal direction. Accordingly, it is preferable that the thickness of the negative electrode active material layer 64 is, for example, 20 µm or more (typically, 50 µm or more) and is, for example, 200 µm or less (typically, 100 µm or less). It is preferable that the size of the negative electrode active material layer 64 in the width direction perpendicular to the longitudinal direction is set in a range of, typically, 80 mm to 150 mm (for example, 100 mm to 120 mm). It is preferable that the density of the negative electrode active material layer 64 is, for example, 0.5 g/cm$^3$ to 2 g/cm$^3$ (typically, 1 g/cm$^3$ to 1.5 g/cm$^3$). By setting the characteristics of the negative electrode active material layer to be in the above-described ranges, the excessive desorption charge carriers from the positive electrode active material layer 54, which faces the outermost circumferential negative electrode 60a (specifically, the negative electrode active material layer 64b on the winding inner circumference side of the negative electrode) and is positioned in the end portion of the positive electrode in the width direction perpendicular to the longitudinal direction, can be suppressed.

Figure 7:
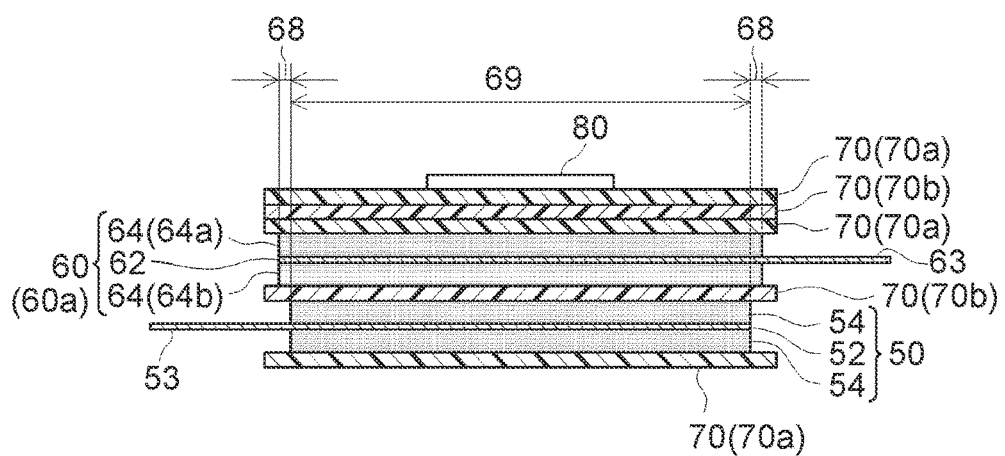
FIG. 7 is a partial sectional view schematically showing a sectional structure taken along line VII-VII of FIG. 6.

In a preferable aspect, as shown in FIGS. 5 and 7, one end portion of the positive electrode current collector 52 in the width direction perpendicular to the sheet longitudinal direction is exposed without the positive electrode active material layer 54 being formed thereon in a belt shape along the sheet longitudinal direction. Likewise, one end portion of the negative electrode current collector 62 in the width direction perpendicular to the sheet longitudinal direction is exposed without the negative electrode active material layer 64 being formed thereon in a belt shape along the sheet longitudinal direction. Hereinafter, the exposure portion of the positive electrode current collector 52 will also be referred to as "positive electrode current collector exposure end portion 53", and the exposure portion of the negative electrode current collector 62 will also be referred to as "negative electrode current collector exposure end portion 63".

In a preferable aspect, as shown in FIGS. 2, 4, 5, and 7, the positive electrode 50, the negative electrode 60, and the separators 70a, 70b are laminated and wound around the winding axis WL such that the positive electrode current collector exposure end portion 53 and the negative electrode current collector exposure end portion 63 protrude to opposite sides of the separators 70a, 70b in the width direction, that is, such that the positive electrode current collector exposure end portion 53 and the negative electrode current collector exposure end portion 63 protrude opposite sides of the wound electrode body 20 in the winding axial direction.

As shown in FIG. 7, in one of the end portions of the negative electrode active material layer 64 in the width direction where the negative electrode current collector exposure end portion 63 is present, the negative electrode current collector exposure end portion 63 (that is, the negative electrode current collector 62) functions as a barrier. Therefore, charge carriers in the negative electrode active material layer 64b on the winding inner circumference side are not likely to move to the negative electrode active material layer 64a on the winding outer circumference side. Therefore, in the outermost circumferential negative electrode 60a during charging, as shown in FIG. 8, in one of the end portions of the negative electrode active material layer 64 in the width direction where the negative electrode current collector exposure end portion 63 is not present, the amount of charge carriers, which move from the negative electrode active material layer 64b on the winding inner circumference side to the negative electrode active material layer 64a on the winding outer circumference side, is likely to increase. That is, charge carriers are selectively extracted from the end portion of the positive electrode active material layer 54 in the width direction which faces the outermost circumferential negative electrode 60a (that is, the negative electrode active material layer 64b on the winding inner circumference side of the negative electrode) and is the end portion where the negative electrode current collector exposure end portion 63 is not present (that is, the end portion where the positive electrode current collector exposure end portion 53 is present). In the nonaqueous electrolyte battery 100 according to the invention, the excessive desorption charge carriers from the positive electrode active material layer 54, which faces the outermost circumferential negative electrode 60a (specifically, the negative electrode active material layer 64b on the winding inner circumference side of the negative electrode) and is positioned in the end portion of the positive electrode in the width direction perpendicular to the longitudinal direction, is suppressed. The above-described effects can be exhibited in a nonaqueous electrolyte secondary battery including a wound electrode body in which the components are wound such that: the negative electrode current collector exposure end portion 63 is provided in one of the end portions of the positive electrode current collector in the width direction; the positive electrode current collector exposure end portion 53 is provided in one of the end portions of the negative electrode current collector in the width direction; and the positive electrode current collector exposure end portion 53 and the negative electrode current collector exposure end portion 63 protrude opposite sides of the wound electrode body 20 in the winding axial direction.

As shown in FIG. 2, a positive electrode current collector plate 42a is attached to the positive electrode current collector exposure end portion 53, and a negative electrode current collector plate 44a is attached to the negative electrode current collector exposure end portion 63. As a result, the positive electrode terminal 42 and the negative electrode terminal 44 are electrically connected to each other.

Figure 6:
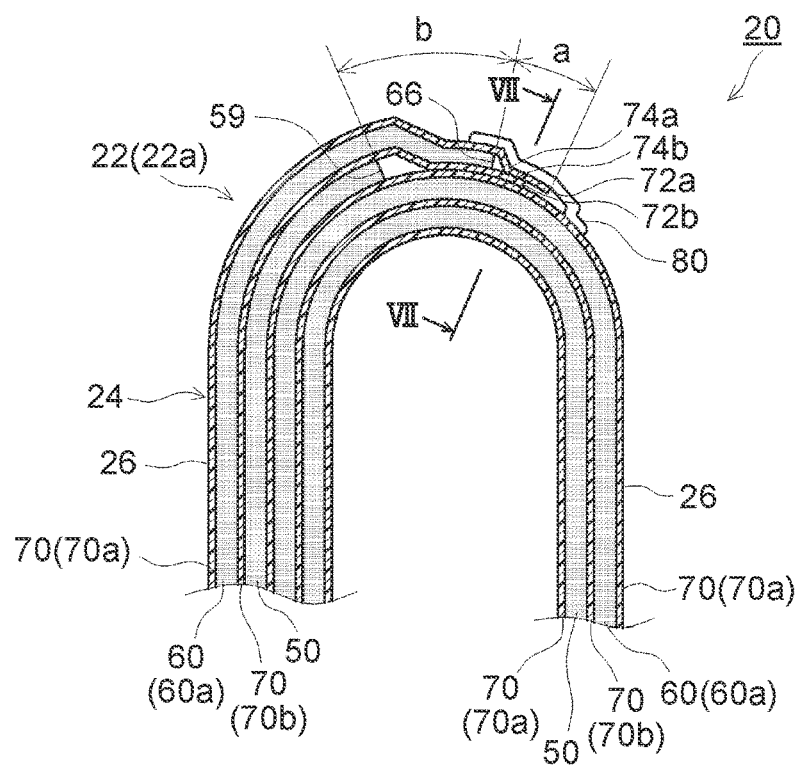
FIG. 6 is a longitudinal partial sectional view schematically showing a sectional structure taken along line VI-Vi of FIG. 4, in which major components of the wound electrode body according to the embodiment are enlarged.

In the wound electrode body 20 included in the nonaqueous electrolyte secondary battery 100 disclosed herein, as shown in FIGS. 4 and 6, the positive electrode 50, the negative electrode 60, and the separators 70a, 70b are wound such that the positive electrode winding end 56 which is the winding end of the positive electrode 50 and the positive electrode winding end 56 is positioned outside the wound electrode body, the negative electrode winding end 66 which is the winding end of the negative electrode 60 and the negative electrode winding end 66 is positioned outside the wound electrode body, and separator winding ends 72a, 72b which are winding ends of the separators 70a, 70b and are positioned outside the wound electrode body are positioned on the same curved portion 22 (here, the upper curved portion 22a). From the viewpoint of reducing the deviation in the pressure applied to the wound electrode body 20 when the center flat portion 24 of the wound electrode body 20 is pressed, it is preferable that the positive electrode winding end 56, the negative electrode winding end 66, and the separator winding ends 72a, 72b are positioned inside the two flat surfaces 26 of the center flat portion 24 of the wound electrode body 20 in the thickness direction of the wound electrode body 20. The curved portion 22 may be the upper curved portion 22a or the lower curved portion 22b. For example, the curved portion 22 may be the upper curved portion 22a.

Figure 9:
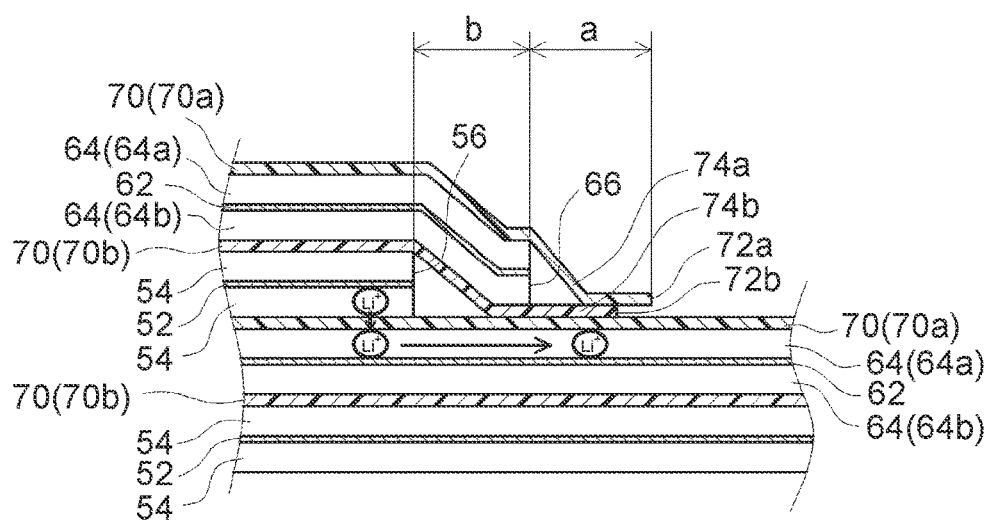
FIG. 9 is a partially enlarged view in which the major parts of the wound electrode body of FIG. 6 are further enlarged, schematically showing the movement of charge carriers from a positive electrode winding end to a portion of the negative electrode active material layer on the winding outer circumference side of the outermost circumferential negative electrode where surplus separator regions of separators are laminated.

As shown in FIGS. 4, 6, and 9, in the wound electrode body 20, the negative electrode winding end 66 is arranged at a position where the negative electrode winding end 66 is parallel to the positive electrode winding end 56, or at an advanced position from the positive electrode winding end 56 in a winding direction. From the viewpoint of the acceptability of charge carriers, it is preferable that the negative electrode winding end 66 is arranged at an advanced position from the positive electrode winding end 56 in the winding direction.

As shown in FIGS. 4, 6, and 9, in the wound electrode body 20, the separator winding end of at least one of the two separators 70a, 70b (here, the winding ends 72a, 72b of the two separators 70a, 70b) are arranged at an advanced position from the negative electrode winding end 66 in the winding direction. As a result, surplus portions (that is, surplus separator regions 74a, 74b) which do not contact both the positive electrode 50 and the negative electrode 60 are formed by a part of the separators 70 which protrude from the negative electrode winding end 66 in the winding direction.

As shown in FIGS. 6 and 9, from the viewpoint of securing the insulating properties between the wound electrode body 20 and the inner wall of the battery case 30, it is preferable that the separator winding end 72a of the separator 70a, which is positioned on the outermost circumference of the wound electrode body 20, is arranged at an advanced position from the negative electrode winding end 66 in the winding direction. From the viewpoint of reliably insulating the positive electrode 50 and the negative electrode 60 from each other, it is preferable that the separator winding end 72b of the separator 70b, which is positioned between the outermost circumferential negative electrode 60*a* and the positive electrode 50 facing the negative electrode, is arranged at an advanced position from the negative electrode winding end 66 in the winding direction. That is, it is more preferable that the separator winding ends 72*a*, 72*b* of the two separators 70*a*, 70*b* are arranged at an advanced position from the negative electrode winding end 66 in the winding direction. For example, the separator winding ends 72*a*, 72*b* of the two separators 70*a*, 70*b* may be arranged at positions which are parallel to the separator winding ends 72*a*, 72*b* in the winding direction. That is, the surplus separator regions may be present on the curved portion 22 (here, the upper curved portion 22*a*) in a state where a surplus separator region of one separator (here, the surplus separator region 74*b* of the separator 70*b*) is laminated on a part of a surplus separator region of the other separator (here, the surplus separator region 74*a* of the separator 70*a*).

In a portion where the surplus separator regions 74*a*, 74*b* are present, as compared to in the other portions where the surplus separator regions 74*a*, 74*b* are not present, a larger amount of nonaqueous electrolytic solution is stored in the separators 70*a*, 70*b* of the surplus separator regions 74*a*, 74*b*. In a portion of the surplus separator regions 74*a*, 74*b* where the surplus separator regions 74*a*, 74*b* of the two separators 70*a*, 70*b* are laminated, a larger amount of nonaqueous electrolytic solution is stored in the surplus separator regions 74*a*, 74*b*. Therefore, in the negative electrode active material layer 64 which faces the portions where the surplus separator regions 74*a*, 74*b* of the two separators 70*a*, 70*b* are laminated (the negative electrode active material layer 64 of the outermost circumferential negative electrode 60*a*, that is, the negative electrode active material layer 64*a* on the outer circumference side of the wound electrode body 20), charge carriers are smoothly diffused (the diffusion of charge carriers is accelerated). According to the investigation by the present inventors, it was found that the movement of charge carriers from the negative electrode active material layer 64*b* on the winding inner circumference side to the negative electrode active material layer 64*a* on the winding outer circumference side in the end portion of the outermost circumferential negative electrode 60*a* in the width direction (that is, in the winding axial direction of the wound electrode body) and the diffusion of charge carriers in the negative electrode active material layer 64*a* on the winding outer circumference side are accelerated by supplying oxygen to the negative electrode active material layer 64*a* on the winding outer circumference side. Oxygen which is present between the inner wall of the battery case 30 and the curved surface of the curved portion 22 of the wound electrode body 20 may be easily supplied to a portion of the negative electrode active material layer 64*a* on the winding outer circumference side of the outermost circumferential negative electrode 60*a* where the surplus separator regions 74*a*, 74*b* are laminated. Due to these reasons, charge carriers are selectively extracted from the end portion of the positive electrode active material layer 54 in the width direction which faces the portion of the outermost circumferential negative electrode 60*a* where the surplus separator regions 74*a*, 74*b* are laminated (typically, from the end portion where the negative electrode current collector exposure end portion 63 is not present, that is, the end portion where the positive electrode current collector exposure end portion 53 is present). In the nonaqueous electrolyte battery 100 according to the invention, the excessive desorption of charge carriers from the positive electrode active material layer 54, which faces the outermost circumferential negative electrode 60*a* (specifically, the negative electrode active material layer 64*b* on the winding inner circumference side of the negative electrode) and is positioned in the end portion of the positive electrode in the width direction perpendicular to the longitudinal direction, is suppressed. Therefore, the desorption of charge carriers from the end portion of the positive electrode active material layer 54 in the width direction, which face the portion of the outermost circumferential negative electrode 60*a* where the surplus separator regions 74*a*, 74*b* are laminated, can also be suitably suppressed.

Here, as shown in FIGS. 6 and 9, when a distance from the negative electrode winding end 66 to one (here, the separator winding end 72*a*) of the two separator winding ends (72*a*, 72*b*) which is arranged at a more advanced position in the winding direction is represented by a (mm), and when a distance from the positive electrode winding end 56 to the negative electrode winding end 66 is represented by b (mm), the distance a and the distance b satisfy relationships $0.5 \leq a \times (a+b) \leq 104$ and $0 \leq b \leq 11$.

Here, FIG. 9 is an enlarged view showing major parts of FIG. 6 (the positive electrode winding end 56, the negative electrode winding end 66, and the curved portion where the separator winding ends 72*a*, 72*b* are laminated). FIG. 9 shows the movement of charge carriers from the positive electrode winding end 56 to the portion of the negative electrode active material layer 64*a* on the winding outer circumference side of the outermost circumferential negative electrode 60*a* where the surplus separator regions 74*a*, 74*b* are laminated. In the drawing, "Li+" represents charge carriers (typically, lithium ions), and arrows represent a movement direction of the charge carriers. In FIG. 8, for easy understanding of the movement of charge carriers between the positive electrode 50 and the negative electrode 60, the curved surface of the curved portion is shown as a flat surface. In FIG. 6, a winding stopper 80 is not shown.

By reducing the distance a, the range of the negative electrode 60 where the surplus separator regions 74*a*, 74*b* are laminated can be reduced. As a result, the amount of charge carriers moving to the negative electrode active material layer 64*a* on the winding outer circumference side can be reduced in the negative electrode 60 which is positioned on the outermost circumference side of the wound electrode body 20 (that is, the outermost circumferential negative electrode 60*a*). On the other hand, from the viewpoint of securing the insulating properties between the positive electrode 50 and the negative electrode 60 or the insulating properties between the wound electrode body 20 (typically, the outermost circumferential negative electrode 60*a*) and the battery case 30, it is preferable that the distance a (mm) is set to be a length in consideration of a variation which may be generated in the process of manufacturing the wound electrode body 20 (for example, $0.5 \leq a$; typically, $1 \leq a$; in general, $2 \leq a$).

As shown in FIG. 9, during the charging of the battery, charge carriers, which have moved from the positive electrode active material layer 54 of the positive electrode winding end 56 to the negative electrode active material layer 64 facing the positive electrode active material layer 54, may be diffused in a direction where the positive electrode active material layer 54 facing the negative electrode active material layer 64 is not present (that is, the winding direction of the negative electrode active material layer 64). By reducing the distance b, the distance between the positive electrode winding end 56 and the surplus separator regions 74*a*, 74*b* is reduced. Charge carriers are easily supplied from the positive electrode winding end 56 to the portion of the negative electrode active material layer 64a on the winding outer circumference side of the outermost circumferential negative electrode 60a where the surplus separator regions 74a, 74b are laminated. On the other hand, from the viewpoint of the acceptability of charge carriers, it is preferable that the positive electrode winding end 56 is covered with the outermost circumferential negative electrode 60a, that is, the negative electrode winding end 66 is positioned at an advanced position from the positive electrode winding end 56 in the winding direction (0<b). In consideration of a variation which may be generated in the process of manufacturing the wound electrode body 20, the distance b (mm) may be in a range of, for example, $0.5 \leq b$ (typically, $1 \leq b$; in general, $2 \leq b$).

Therefore, it is preferable that the distance a (mm) satisfies $0.5 \leq a \leq 8$ (for example, $1 \leq a \leq 8$; typically, $2 \leq a \leq 8$). It is preferable that the distance b (mm) satisfies $0.5 \leq b \leq 11$ (for example, $1 \leq b \leq 11$; typically, $2 \leq b \leq 11$). It is more preferable that the distance a (mm) and the distance b (mm) satisfy $0.5 \leq a \times (a+b) \leq 50$ (for example, $2 \leq a \times (a+b) \leq 50$; typically, $8 \leq a \times (a+b) \leq 50$).

Typically, as shown in FIGS. 3, 6, and 7, in order to prevent the unwinding of the wound electrode body 20 (the loosening of the winding), one (here, the separator winding end 72a) of the two separator winding ends 72a, 72b of the separators 70 which is positioned outside the wound electrode body is fixed to the outer surface of the wound electrode body 20 through the winding stopper 80. It is preferable that the separator winding end 72a is fixed such that both ends of the winding stopper 80 in the winding direction are positioned on the same curved portion 22 (for example, the upper curved portion 22a) as that of the separator winding ends 72a, 72b. It is more preferable that both ends of the winding stopper 80 in the winding direction are positioned inside the two flat surfaces 26 of the wound electrode body 20 in the thickness direction of the wound electrode body 20.

The winding stopper 80 is not particularly limited as long as the separator winding end 72a can be fixed to the outer surface of the wound electrode body 20. Typically, an single-sided or double sided adhesive tape may be used. For example, by attaching a single-sided adhesive tape to the outer surface of the wound electrode body 20 while covering a part of the separator winding end 72a, the separator winding end 72a can be fixed to the outer surface of the wound electrode body 20. From the viewpoint of reducing the volume of the winding stopper 80 in the battery case 30, it is preferable that the size of the winding stopper 80 is small. For example, the thickness of the winding stopper 80 may be about 20 μm to 50 μm. Regarding the size of the winding stopper 80, the length thereof in a direction, which matches with the winding axial direction when the winding stopper 80 is arranged in the wound electrode body, may be about 5 mm to 20 mm.

The size of the wound electrode body 20 is not particularly limited. For example, the length in the winding axial direction can be set in a range of typically 80 mm to 200 mm (for example, 120 mm to 150 mm), the length of an arc of the curved surface of the curved portion 22 can be set in a range of 10 mm to 40 mm (about 20 mm), the length in a direction perpendicular to the winding axis (for example, the length from the top of the upper curved portion 22a to the top of the lower curved portion 22b) can be set in a range of 30 mm to 100 mm (about 60 mm), and the thickness (the distance from one flat surface 26 to the other flat surface 26) can be set in a range of typically 10 mm to 25 mm (about 12.5 mm).

Here, the materials and members constituting the wound electrode body 20 (for example, the materials and members constituting the positive electrode 50, the negative electrode 60, and the separators 70) and the nonaqueous electrolyte (typically, nonaqueous electrolytic solution) may have the same configurations as in a general nonaqueous electrolyte secondary battery (typically, lithium ion secondary battery) of the related art without any particular limitation. A typical configuration will be described below.

As the positive electrode current collector 52, a positive electrode current collector which is used for a lithium ion secondary battery in the related art can be used without any particular limitation. Typically, it is preferable that the positive electrode current collector 52 is formed of a highly conductive metal material, and examples of the metal material include aluminum, nickel, titanium, and stainless steel. In particular, aluminum (aluminum foil) is preferable. The thickness of the positive electrode current collector 52 is not particularly limited and is preferably 5 μm to 50 μm and more preferably 8 μm to 30 μm in consideration of a balance between the capacity density of the battery and the strength of the current collector.

The positive electrode active material layer 54 formed on the positive electrode current collector 52 contains at least a positive electrode active material. As the positive electrode active material, a lithium-containing compound (for example, lithium transition metal composite oxide) containing lithium and one kind or two or more kinds of transition metal elements can be preferably used, in which the lithium-containing compound is a material capable of storing and releasing lithium ions. Examples of the positive electrode active material include lithium nickel composite oxide (for example, $LiNiO_2$), lithium cobalt composite oxide (for example, $LiCoO_2$), lithium manganese composite oxide (for example, $LiMn_2O_4$), and a ternary lithium-containing composite oxide such as lithium nickel cobalt manganese composite oxide (for example, $LiNi_{1/3}Co_{1/3}Mn_{1/3}O_2$). In addition, as the positive electrode active material, a polyanionic compound (for example, $LiFePO_4$, $LiMnPO_4$, $LiFeVO_4$, $LiMnVO_4$, $Li_2FeSiO_4$, $Li_2MnSiO_4$, or $Li_2CoSiO_4$) represented by a formula of $LiMPO_4$, $LiMVO_4$, or $Li_2MSiO_4$ (wherein M represents at least one element selected from among Co, Ni, Mn, and Fe) may be used. Among these, one kind can be used alone, or two or more kinds can be used in combination.

For example, even in a case where the battery 100 according to the embodiment is stored at a high temperature (high-temperature aging) in a state where being charged to a high potential, the elution of a metal component from the positive electrode active material is suppressed. The above-described effect can be exhibited, for example, in a battery in which a lithium transition metal composite oxide containing either or both of manganese (Mn) and nickel (Ni) which are likely to be eluted at a high temperature is used as a positive electrode active material. Accordingly, in the battery 100 disclosed herein, it is preferable that a lithium transition metal composite oxide containing at least one of manganese and nickel is used as a positive electrode active material because the effect can be exhibited sufficiently and clearly. Examples of the lithium transition metal composite oxide include a lithium nickel composite oxide (for example, $LiNiO_2$), a lithium manganese composite oxide (for example, $LiMn_2O_4$), and a lithium nickel cobalt manganese composite oxide (for example, $LiNi_{1/3}Co_{1/3}Mn_{1/3}O_2$).

In addition to the positive electrode active material, optionally, the positive electrode active material layer 54 may further contain optional components such as a conductive material and a binder. As the conductive material and the binder, a conductive material and a binder which are used in a positive electrode 50 of a lithium ion secondary battery in the related art can be appropriately adopted. As the conductive material, for example, a carbon material such as carbon black (for example, acetylene black (AB)) or graphite may be preferably used. As the binder, for example, polyvinylidene fluoride (PVDF) may be used.

First, the positive electrode active material and other optional materials are dispersed in an appropriate solvent (for example, N-methyl-2-pyrrolidone) to prepare a paste-like (slurry-like) composition. Next, an appropriate amount of the composition is applied to a surface of the positive electrode current collector 52 and then is dried. As a result, the positive electrode 50 can be formed. By optionally performing an appropriate pressing treatment, the characteristics (for example, average thickness, density, and porosity) of the positive electrode active material layer 54 can be adjusted.

The thickness of the positive electrode active material layer 54 after being pressed is, for example, 20 μm or more (typically, 50 μm or more) and is, for example, 200 μm or less (typically, 100 μm or less). The density of the positive electrode active material layer 54 is not particularly limited, but is, for example, 1.5 g/cm$^3$ or more (typically, 2 g/cm$^3$ or more) and is, for example, 4.5 g/cm$^3$ or less (typically, 4.2 g/cm$^3$ or less). The positive electrode active material layer 54 having the above-described configuration can realize high battery performance (for example, high energy density and output density).

As the negative electrode current collector 62, a negative electrode current collector which is used in a lithium ion secondary battery in the related art can be used without any particular limitation. Typically, it is preferable that the negative electrode current collector 62 is formed of a highly conductive metal, and examples of the material include copper and an alloy containing copper as a major component. The thickness of the negative electrode current collector 62 is not particularly limited and is preferably 5 μm to 50 μm and more preferably 8 μm to 30 μm in consideration of a balance between the capacity density of the battery and the strength of the current collector.

The negative electrode active material layer 64 formed on the negative electrode current collector 62 contains at least a negative electrode active material. As the negative electrode active material, one material or two or more materials selected from among materials which are used in a lithium ion secondary battery in the related art may be used without any particular limitation. Examples of the negative electrode active material include a particulate (spherical or flaky) carbon material at least partially containing a graphite structure (layered structure), a lithium transition metal composite oxide (for example, a lithium titanium composite oxide such as $Li_4Ti_5O_{12}$), and a lithium transition metal composite nitride. Examples of the carbon material include natural graphite, artificial graphite, non-graphitizable carbon (hard carbon), and graphitizable carbon (soft carbon). Alternatively, carbon particles obtained by coating graphite particles as a core with an amorphous carbon material may be used.

In addition to the negative electrode active material, optionally, the negative electrode active material layer 64 may further contain optional components such as a binder and a thickener. As the binder and the thickener, a binder and a thickener which are used in a negative electrode of a lithium ion secondary battery in the related art can be appropriately adopted. As the binder, for example, styrene-butadiene rubber (SBR) may be suitably used. As the thickener, for example, carboxymethyl cellulose (CMC) may be suitably used.

The negative electrode 60 can be formed, for example, using a method including: dispersing the negative electrode active material and other optional materials in an appropriate solvent (for example, ion exchange water) to prepare a paste (slurry) composition; applying an appropriate amount of the composition to a surface of the negative electrode current collector 62; and drying the composition to remove the solvent. By optionally performing an appropriate pressing treatment, the characteristics (for example, average thickness, density, and porosity) of the negative electrode active material layer 64 can be adjusted.

As the elongated sheet-shaped separators 70a and 70b, a well-known microporous sheet of the related art can be used without any particular limitation. Examples of the separator 70 include a porous resin sheet (for example, a film or a non-woven fabric) formed of a resin such as polyethylene (PE), polypropylene (PP), polyester, cellulose, or polyamide. The porous resin sheet may have a single-layer structure or a multilayer structure including two or more layers (for example, a three-layer structure in which a PP layer is laminated on each of both surfaces of a PE layer). A porous heat resistance layer may be provided on a single surface or both surfaces (typically, one surface) of the porous resin sheet. This heat resistance layer may be, for example, a layer containing an inorganic filler and a binder. As the inorganic filler, for example, alumina, boehmite, or silica can be preferably adopted. It is preferable that the thickness of the separator is set in a range of, for example, 10 μm to 40 μm.

As the nonaqueous electrolytic solution, for example, a nonaqueous electrolytic solution containing a supporting electrolyte in an organic solvent (nonaqueous solvent) can be typically used. Examples of the nonaqueous solvent include ethylene carbonate (EC), propylene carbonate (PC), diethyl carbonate (DEC), dimethyl carbonate (DMC), and ethyl methyl carbonate (EMC). Among these, one kind may be used, or two or more kinds can be appropriately used in combination (for example, a mixed solvent containing EC, EMC, and DMC at a volume ratio of 3:4:3). As the supporting electrolyte, for example, a lithium salt such as $LiPF_6$, $LiBF_4$, or $LiClO_4$ (preferably, $LiPF_6$) can be used. The concentration of the supporting electrolyte is, for example, 0.7 mol/L to 1.3 mol/L (preferably about 1.1 mol/L).

Even when the nonaqueous electrolyte secondary battery 100 having the above-described configuration is stored at a high temperature in a state of being charged (typically, 45° C. or higher; for example, 60° C. or higher), the self-discharge amount can be suppressed to be low without the occurrence of small short-circuiting. Accordingly, for example, after the construction and initial charging (conditioning treatment), the battery 100 can suitably withstand high-temperature storage such as a high-temperature aging treatment. That is, for example, the following initial charging (conditioning treatment) and the high-temperature aging treatment can be suitably performed within a short period of time.

[Initial Charging (Conditioning Treatment)]

The initial charging (conditioning treatment) is charging and discharging for stabilizing the battery performance, and conditions thereof are not particularly limited. For example, at an appropriate current density, charging and discharging are performed once or plural times.

[High-Temperature Aging Treatment]

In the high-temperature aging treatment, typically, the battery is held in a high temperature range (typically, 45° C. or higher; for example, 60° C. or higher) after the conditioning treatment or without performing the conditioning treatment. In the high-temperature aging treatment, typically, first, the battery is charged such that the positive electrode potential is higher than a redox potential of foreign metal which is unavoidably incorporated as a dissolution target, and is held in this charging state for a predetermined amount of time. For example, in a case where copper (Cu) is dissolved as foreign metal, the battery voltage can be controlled to be equal to or higher than 3.8 V which is the redox potential of Cu. For example, in consideration of a voltage drop in the aging treatment, the battery voltage can be controlled to be 3.9 V or higher. By controlling the temperature of the aging treatment to be, for example, 45° C. or higher (preferably, 60° C. or higher), it can be expected that a reaction which advances during the aging treatment is promoted. For example, the dissolution reaction of the foreign metal incorporated into the wound electrode body 20 can be suitably promoted, and the processing time and the manufacturing costs can be reduced. The temperature of the aging treatment may be higher than 45° C. and is, for example, 50° C. or higher and is preferably 60° C. or higher (for example, higher than 65° C.). Further, the temperature of the aging treatment may be 70° C. or higher (for example, higher than 70° C.; may be about 80° C.). The upper limit of the temperature of the aging treatment is not particularly limited and is, for example, about 85° C. or lower in order to maintain the stabilization of the nonaqueous electrolyte secondary battery 100. The time of the aging treatment can be appropriately set in consideration of the object of the aging treatment, the configuration (size) of the nonaqueous electrolyte secondary battery 100 to be manufactured, and the like. For example, the size of the battery, the characteristics (for example, size or solubility in the electrolytic solution) of the foreign metal as the dissolution target, and the like can also be considered. In this way, although it varies, the time of the aging treatment may be about ½ to ⅒ the time required for an aging treatment of the related art which is performed in a temperature range of, for example, lower than 50° C. and may be set with reference to the time of the aging treatment in the related art.

Typically, the initial charging (conditioning treatment) and the high-temperature aging treatment may be performed in a state where the center flat portion 24 of the wound electrode body 20 accommodated in the battery case 30 is pressed at a predetermined pressure in a direction perpendicular to the flat surfaces 26 of the center flat portion 24. That is, the initial charging (conditioning treatment) and the high-temperature aging treatment may be performed in a state where the pressure is applied to the wide side surfaces 37 of the battery case 30 which accommodates the wound electrode body 20 in the direction perpendicular to the wide side surfaces 37. By pressing the wound electrode body 20 (by applying the pressure to the battery case 30) to reduce the distance between the positive electrode 50 and the negative electrode 60, and the aging treatment can be efficiently performed. A minimum amount of the nonaqueous electrolytic solution may be impregnated into the wound electrode body 20. In a case where the nonaqueous electrolyte secondary battery 100 disclosed herein is used while being restrained, a cell reaction equivalent to that during actual use can be promoted by performing the initial charging (conditioning treatment) and the high-temperature aging treatment while restraining the battery under the same conditions as those during use. In the battery 100 according to the invention, the formation of a step difference, which is caused by arranging the positive electrode winding end 56, the negative electrode winding end 66, or the separator winding ends 72a, 72b on the flat surface 26 of the wound electrode body 20, is suppressed. Therefore, even in a case where the center flat portion 24 of the wound electrode body 20 is used while being pressed at a predetermined pressure, the center flat portion 24 can be pressed at a substantially uniform pressure (that is, the deviation in the pressure applied to the wound electrode body 20 is not likely to be generated).

Figure 10A:
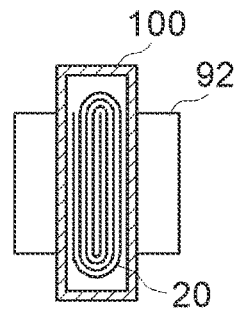
FIG. 10A is a schematic sectional view showing a state where a pressure is not applied to the nonaqueous electrolyte secondary battery according to the embodiment of the invention.
Figure 10B:
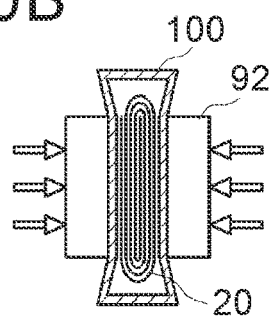
FIG. 10B is a schematic sectional view showing a state where a pressure is applied to the nonaqueous electrolyte secondary battery according to the embodiment of the invention.
Figure 10C:
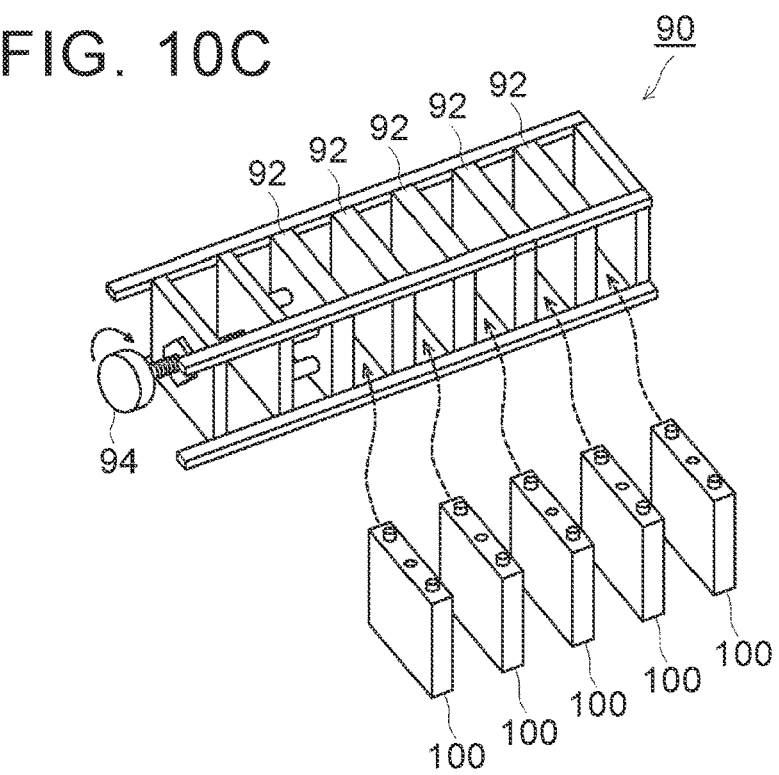
FIG. 10C is a perspective view showing a typical example where a pressure is applied to the plural nonaqueous electrolyte secondary batteries according to the embodiment of the invention.

The pressure can be applied to the battery 100 (the wound electrode body 20 accommodated in the battery case) using one method or two or more methods of the related art. For example, a pressure applying method may be adopted, the method including: interposing the battery 100 between a pair of restraining plates 92 as shown in FIG. 10A; and then squeezing the restraining plates 92 as shown in FIG. 10B. Examples of the squeezing method include a method using a bolt or a restraining band; a method using a press machine such as an air press or a hydraulic press; a method using gravity in which, for example, a weight unit having an appropriate weight is placed on the battery case; and a method of reducing the pressure using a vacuum furnace or the like. During the pressure application, typically, it is preferable to use an appropriate jig (for example, the restraining plate 92). For example, a method of applying the pressure to the pair of wide side surfaces 37 of the battery 100 while interposing the battery 100 between the restraining plates 92 can be suitably used. By using the restraining plates 92, a pressure can be relatively uniformly applied to the entire region of the battery case 30 (specifically, the wound electrode body 20 in the case). In addition, for example, when a pressure is applied to plural batteries 100, a restraining jig 90 using a coil spring shown in FIG. 10C can be preferably used. In a case where the restraining jig 90 is used, for example, the nonaqueous electrolyte secondary battery 100 is accommodated between the restraining plates 92, and then a knob portion 94 is rotated to adjust the coil spring. As a result, an arbitrary pressure is applied to the pair of wide side surfaces of the battery 100. The magnitude (value) of the applied pressure can be obtained using a well-known pressure measuring method (for example, a method using a load cell or a strain gauge). In addition, the pressure application may be performed in one go or may be performed stepwise through, for example, two or more steps. A range in which the wide side surfaces 37 of the battery case 30 are restrained (that is, the size of the restraining plates 92) is equivalent to that of the center flat portion 24 of the wound electrode body 20 (for example, the same size as that of the wide side surfaces 37 of the battery case 30).

The pressure applied to the nonaqueous electrolyte secondary battery 100 (specifically, the wound electrode body 20 included in the battery) is not particularly limited. It is not preferable that the applied pressure is extremely high because the battery case 30 may be excessively deformed, voids (pores) present in the electrode body 20 (typically, the positive electrode 50, the negative electrode 60, or the separators 70) may collapse, or the battery performance may be adversely affected. Therefore, the pressure can be set to be in a range of 0.2 MPa or higher (preferably, 0.5 MPa or higher) and 10 MPa or lower (preferably, 5 MPa or lower). "The pressure" described in this specification refers to a relative pressure with respect to the atmospheric pressure, that is, a pressure value obtained by subtracting the atmospheric pressure (about 0.1 MPa) from the actual pressure (absolute pressure).

Figure 11:
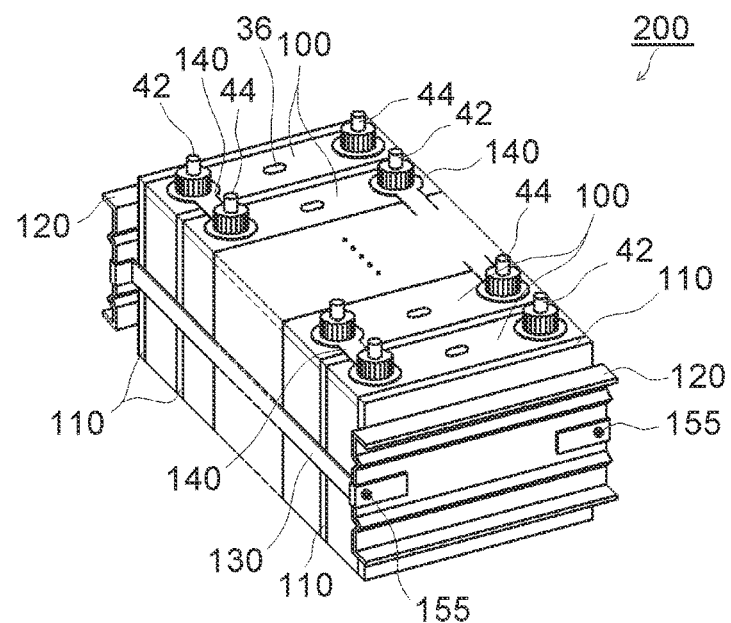
FIG. 11 is a perspective view showing a configuration of a battery pack according to the embodiment.
Figure 12:
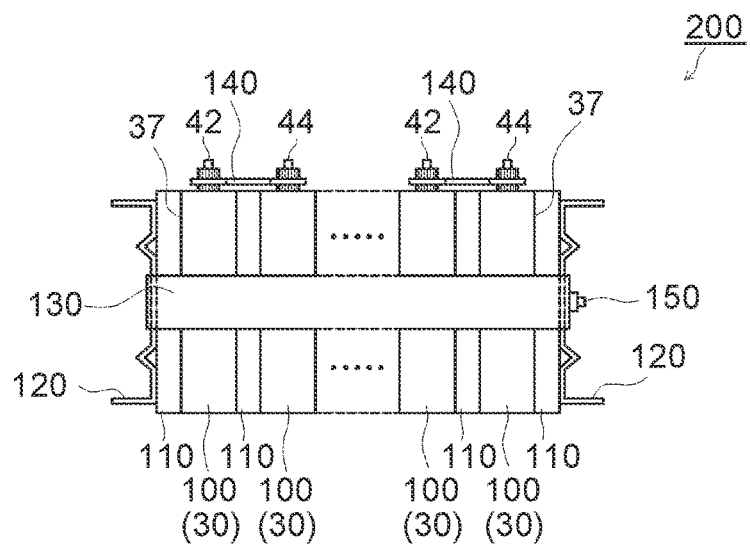
FIG. 12 is a side view showing a configuration of the battery pack according to the embodiment.

Next, an example of a battery pack 200 (typically, a battery pack in which plural single cells are connected to each other in series) will be described, in which the nonaqueous electrolyte secondary battery (lithium ion secondary battery) 100 is used as a single cell, and the plural single cells are provided. As shown in FIGS. 11 and 12, in the battery pack 200, among the plural (typically 10 or more and preferably about 10 to 30; for example 20) nonaqueous electrolyte secondary batteries (single cells) 100, every other one is reversed such that the positive electrode terminals 42 and the negative electrode terminals 44 are alternately arranged, and are arranged in a direction in which the wide side surface 37 of the battery cases 30 face each other, that is, in a direction in which the center flat portions 24 of the flat wound electrode bodies 20 in the battery cases 30 face each other. Spacing plates (spacers) 110 having a predetermined shape are interposed between the arranged single cells 100. It is preferable that the spacing plates 110 are formed of a material and/or have a shape which can make it function as a dissipation member for efficiently dissipating heat generated in each of the single cells 100 during use. For example, the spacing plates 100 have a shape in which a cooling fluid (typically, air) can be introduced between the single cells 100 (for example, a shape in which plural parallel grooves vertically extending from one end of the rectangular cooling plate to an opposite end thereof are provided on the surface of the cooling plate). The cooling plate is preferably formed of metal having high thermal conductivity, light-weight hard polypropylene, or another synthetic resin.

A pair of end plates (restraining plates) 120 are arranged at both end portions of an arranged body including the single cells 100 and the spacing plates 110. The single cells 100, the spacing plates 110, the end plates 120 which are arranged are restrained by a restraining band 130 such that a predetermined restraining pressure is applied in the arrangement direction of the single cells, the restraining band 130 being attached to bridge between the two end plates 120. That is, the single cells are restrained such that the restraining pressure is applied to the center flat portions 24 of the flat wound electrode bodies 20 included in the single cells in a direction perpendicular to the flat surfaces 26 of the center flat portions 24. Specifically, by fastening and fixing end portions of the restraining band 130 to the end plates 120 through screws 155, the single cells and the like are restrained such that a predetermined restraining pressure is applied in the arrangement direction. In the embodiment, the spacing plate 110 is arranged between adjacent single cells 100. Therefore, portions of the wide side surfaces 37 of the battery cases 30 which are adjacent to the spacing plates 110 are pressed by the spacing plates 110. The size of wide side surfaces (restrained surfaces) of the spacing plates 110 which are adjacent to the battery cases 30 of the single cells can be set to be the same as the size of the center flat portions 24 of the wound electrode bodies 20 included in the respective single cells 100 (for example, to be the same as the size of the wide side surface 37 of the battery cases 30). In the adjacent two single cells 100, the positive electrode terminal 42 of one single cell is electrically connected to the negative electrode terminal 44 of another single cell through a connection member (bus bar) 140. By connecting the single cells 100 to each other in series, the battery pack 200 having a desired voltage is constructed.

The restraining pressure at which the respective singles cells are restrained is not particularly limited. For example, the restraining pressure may be set such that the center flat portions 24 of the wound electrode bodies 20 included in the single cells 100 are pressed in a direction perpendicular to the flat surfaces 26 of the center flat portions 24 (that is, in the arrangement direction of the single cells) at a pressure of 0.2 MPa or higher (preferably 0.5 MPa or higher) and 10 MPa or lower (preferably, 5 MPa or lower). In each of the single cells 100 according to the invention, the formation of a step difference, which is caused by arranging the positive electrode winding end 56, the negative electrode winding end 66, or the separator winding ends 72a, 72b on the flat surface 26 of the wound electrode body 20, is suppressed. Therefore, even in a case where the center flat portion 24 of the wound electrode body 20 included in each of the single cells 100 is used while being pressed at a predetermined pressure, the center flat portion 24 can be pressed at a substantially uniform pressure (that is, the deviation in the pressure applied to the wound electrode body 20 is not likely to be generated). Accordingly, the nonaqueous electrolyte secondary battery (typically, the lithium ion secondary battery) 100 disclosed herein is suitable for the battery pack 200 including the single cells and is suitable as each of the single cells 100 constituting the battery pack in which each of the single cells is restrained such that the center flat portion 24 of the wound electrode body 20 included in the single cell is pressed in a direction perpendicular to the flat surfaces 26 of the center flat portion 24.

In the nonaqueous electrolyte secondary battery disclosed herein, in a case where the center flat portion of the wound electrode body is pressed in a direction perpendicular to the flat surfaces of the center flat portion, the deviation in the pressure applied to the wound electrode body and the occurrence of small short-circuiting can be reduced. Accordingly, due to its characteristics, the secondary battery disclosed herein can be preferably used as a drive power supply mounted in a vehicle such as a plug-in hybrid vehicle (PHV), a hybrid vehicle (HV), or an electric vehicle (EV). According to the invention, there is provided a vehicle including the secondary battery disclosed herein, preferably, as a power source (typically, a battery pack in which plural secondary batteries are electrically connected to each other).

Hereinafter, several examples (test examples) relating to the invention will be described, but the examples (test examples) are not intended to limit the invention.

Using the following materials and processes, wound electrode bodies according to Examples 1 to 15 shown in Table 1 were constructed.

EXAMPLE 1

The positive electrode was prepared in the following procedure. $LiNi_{0.33}Co_{0.33}Mn_{0.33}O_2$ (LNCM) as positive electrode active material powder; AB as a conductive material; and PVDF as a binder were weighed at a mass ratio (LNCM:AB:PVDF) of 90:8:2. These weighed materials were mixed with NMP to prepare a slurry-like positive electrode active material layer-forming composition. This composition was applied in a belt shape to both surfaces of elongated aluminum foil (positive electrode current collector) having a thickness of 15 μm, was dried, and was pressed. As a result, a positive electrode sheet was prepared. The coating amount and pressing conditions of the positive electrode active material layer-forming composition were adjusted such that the average thickness of the positive electrode was 65 μm (the average thickness of the positive electrode active material layer per single layer was about 25 μm).

The negative electrode was prepared in the following procedure. First, as negative electrode active material powder, graphite (C) having a surface coated with amorphous carbon was prepared. The graphite (C); styrene-butadiene rubber (SBR) as a binder; and CMC as a thickener were weighed at a mass ratio (C:SBR:CMC) of 98:1:1. The weighed materials were mixed with ion exchange water. As a result, a slurry-like negative electrode active material layer-forming composition was prepared. This composition was applied to both surfaces of elongated copper foil (negative electrode current collector) having a thickness of 10 μm to have a belt shape, was dried, and was pressed. As a result, a negative electrode sheet was prepared. The coating amount and pressing conditions of the negative electrode active material layer-forming composition were adjusted such that the average thickness of the negative electrode was 80 μm (the average thickness of the negative electrode active material layer per single layer was about 35 μm).

Two separators having a four-layer structure were prepared by forming a porous polypropylene layer on both surfaces of a porous polyethylene layer and further forming a layer (a so-called heat resistance layer), which includes alumina particles and a binder, on a surface of one of the polypropylene layers. The positive electrode and the negative electrode which were prepared as describe above were laminated in a longitudinal direction with the two separators interposed between the positive electrode and the negative electrode and were wound 30 times (that is, the winding number was 30). The wound body (the positive electrode, the negative electrode, and the separators after being wound) was pressed to be squashed in a direction perpendicular to the winding axis. As a result, a flat wound electrode body was prepared.

Here, in this test example, a positive electrode winding end, a negative electrode winding end, and separator winding ends were arranged at positions satisfying the following conditions (I) to (IV).

(I) The positive electrode winding end, the negative electrode winding end, and the separator winding ends were arranged on the same curved portion (here, the upper curved portion) and were positioned inside the two flat surfaces in the thickness direction of the wound electrode body.

(II) The negative electrode winding end was arranged at an advanced position from the positive electrode winding end in the winding direction.

(III) The separator winding ends of the two separators were parallel to each other in the winding direction and were arranged at advanced positions from the negative electrode winding end in the winding direction.

(IV) When the distance between the separator winding end and the negative electrode winding end was represented by a (mm), and when the distance between the positive electrode winding end and the negative electrode winding end was represented by b (mm), the distance a was 0.5 mm, and the distance b was 0.5 mm.

In the wound electrode body, the thickness was 12.5 mm, the length in the winding axial direction was 130 mm, and the length between the top of the upper curved portion and the top of the lower curved portion was 62.5 mm.

EXAMPLES 2 to 13

Wound electrode bodies according to Examples 2 to 13 were prepared using the same material and process as in Example 1, except that: the distance a (mm) was changed as shown the item "Distance a (mm)" of Table 1; and the distance b (mm) was changed as shown the item "Distance b (mm)" of Table 1.

EXAMPLE 14

Figure 13:
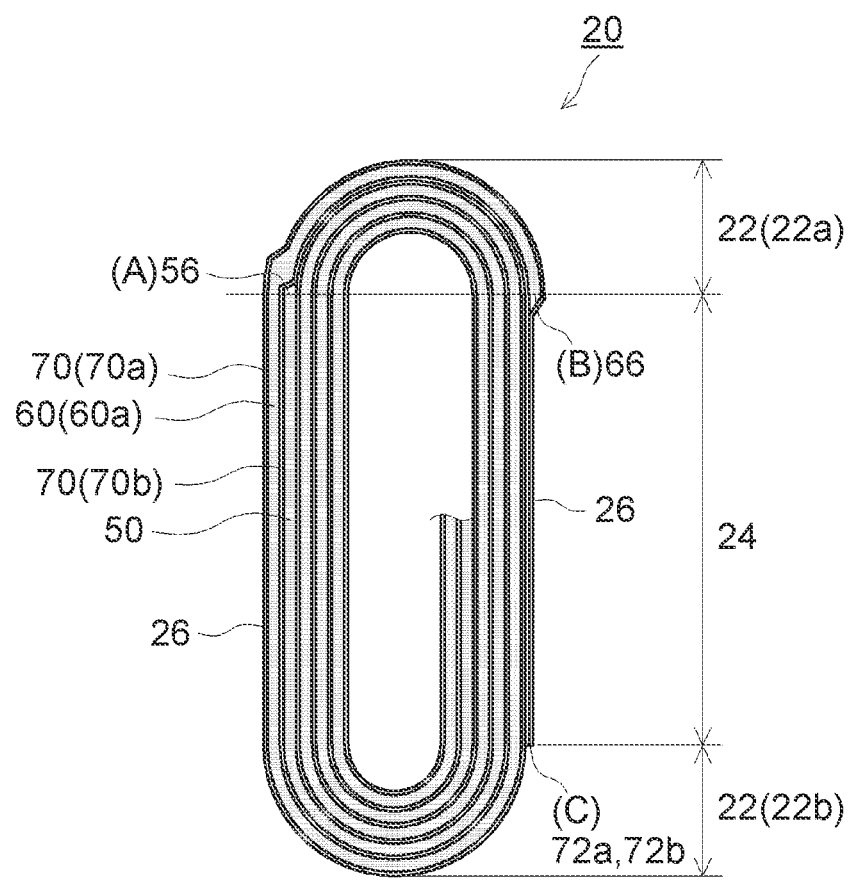
FIG. 13 is a diagram showing positions of a positive electrode winding end, a negative electrode winding end, and separator winding ends in a test example.

A wound electrode body according to Example 14 was prepared using the same material and process as in Example 1, except that the positive electrode winding end, the negative electrode winding end, and the separator winding ends were arranged at A, B, and C in FIG. 13. Specifically, the positive electrode winding end was arranged at the boundary A between the center flat portion and the upper curved portion. The negative electrode winding end was arranged at the boundary B which was the boundary between upper curved portion and the center flat portion and was different from the boundary A. The separator winding ends were arranged at the boundary C which was the boundary between the center flat portion and the lower curved portion and was arranged on the same plane as that of the boundary B.

EXAMPLE 15

A wound electrode body according to Example 15 was prepared using the same material and process as in Example 1, except that the arrangement of the positive electrode winding end, the negative electrode winding end, and the separator winding ends was changed as described below. That is, the positive electrode winding end and the negative electrode winding end were arranged on the lower curved portion, and the separator winding ends were arranged on the upper curved portion. The distance a (mm) was 65 mm, and the distance b (mm) was 10 mm.

Regarding the wound electrode body according to each of the examples, whether or not a step difference was formed on the two flat surfaces of the wound electrode body was determined. A wound electrode body in which a step difference was observed was evaluated as "not good", and a wound electrode body in which a step difference was not observed was evaluated as "good". The results are shown in the item "Step Difference" of Table 1.

Positive and negative electrode lead terminals were welded to the wound electrode body according to each of the examples prepared as described above, and the wound electrode body was accommodated in a box-shaped aluminum case having a shape corresponding to the wound electrode body. An electrolytic solution was injected into the battery case through an opening, and the opening was air-tightly sealed. As a result, a lithium ion secondary battery according to each of the examples was prepared. As the electrolytic solution, a solution was used in which $LiPF_6$ as a supporting electrolyte was dissolved in a mixed solvent at a concentration of 1.1 mol/L, the mixed solvent containing EC, EMC, and DMC at a volume ratio (EC:EMC:DMC) of 30:30:40.

[Initial Charging]

Each of the batteries according to the examples constructed as described above was charged (initially charged). Here, under a temperature condition of 25° C., the battery was charged to 4.1 V at a constant current of 1 C (4 A) to be in a state of charge of 100% (SOC 100%) which was substantially 100% of the rated capacity. "1 C" refers to a current value at which the battery capacity (Ah) estimated from theoretical capacity can be charged in one hour. For example, when the battery capacity was 24 Ah, 1 C refers to 24 A.

[High-Temperature Aging]

Next, after being initially charged as described above, each of the batteries was put into a thermostatic chamber at 80° C., and high-temperature aging was performed for 20 hours. After one day and four days from the completion of the high-temperature aging, the open circuit voltage (OCV) of each of the batteries was measured. Next, a difference (voltage after one day-voltage after four days) between the open circuit voltage of the battery after one day from the high-temperature aging (voltage after one day) and the open circuit voltage of the battery after four day from the high-temperature aging (voltage after four days) was set as a voltage drop amount. A battery having a voltage drop amount which was higher than that of the battery according to Example 1 by higher than 0.5 mV was evaluated as a battery in which small short-circuiting occurred. After the OCV measurement, each of the batteries was disassembled, and whether or not there was a deposit on a negative electrode-facing surface of the separator positioned on the outermost circumference layer of the flat wound electrode body was determined by fluorescent X-ray analysis. After the high-temperature aging, each of the batteries was evaluated in three grades. The results are shown in the item "Small Short-Circuiting" of Table 1.

Very Good: a battery in which small short-circuiting did not occur (the voltage drop amount was lower than the voltage drop amount of the battery according to Example 1 by lower than 0.5 mV) and metal deposited on the separator surface was not observed Good: a battery in which small short-circuiting did not occur (the voltage drop amount was lower than the voltage drop amount of the battery according to Example 1 by lower than 0.5 mV) and metal deposited on the separator surface was observed Not Good: a battery in which small short-circuiting occurred (the voltage drop amount was lower than the voltage drop amount of the battery according to Example 1 by 0.5 mV or higher)

the batteries including the wound electrode bodies according to Examples 1 to 11 (for example, the batteries according to Examples 1 to 11), small short-circuiting did not occur during the high-temperature aging. On the other hand, in the wound electrode bodies included in the batteries according to Examples 12 and 13, no step difference was formed on the flat surfaces of the wound electrode body, but small short-circuiting occurred during the high-temperature aging. It was found from the above results that, from the viewpoint of suppressing the occurrence of small short-circuiting, it is preferable that the relationship a×(a+b) between the distance a (mm) and the distance b (mm) is 0.5 to 104. That is, according to the invention, a nonaqueous electrolyte secondary battery can be provided in which, in a case where the flat wound electrode body is pressed in a direction perpendicular to the flat surfaces of the center flat portion of the wound electrode body, the deviation in the pressure applied to the wound electrode body and the occurrence of small short-circuiting can be reduced.

In Example 14, in particular, the negative electrode winding end is present outside the wound electrode body in the thickness direction compared to the flat surfaces of the wound electrode body. Therefore, a step difference derived from the negative electrode winding end was not formed on the flat surfaces of the wound electrode body. In the battery according to Example 15, the distance a was large, that is, the surplus portions of the separators which did not contact the positive electrode and the negative electrode were wide. Therefore, during charging, charge carriers were excessively desorbed from the positive electrode active material layer facing the portion of the negative electrode which was positioned on the outermost circumference side of the wound electrode bodies and where the surplus portions of the separators were laminated. Therefore, it is considered that small short-circuiting occurred.

In the batteries according to Examples 1 to 6, metal deposited on the separators after the high-temperature aging was not observed. However, in the batteries according to Examples 7 to 11, metal deposited on the separators after the high-temperature aging was observed. When the metal deposited on the negative electrode surface buries the pores

TABLE 1

| Examples | Winding Terminal Positions | | | Distance a (mm) | Distance b (mm) | A × (a + b) | Step Difference | Small Short-Circuiting |
|---|---|---|---|---|---|---|---|---|
| | Positive Electrode | Negative Electrode | Separator | | | | | |
| 1 | Upper Curved Portion | | | 0.5 | 0.5 | 0.5 | Good | Very Good |
| 2 | Upper Curved Portion | | | 2 | 2 | 8 | Good | Very Good |
| 3 | Upper Curved Portion | | | 2 | 5 | 14 | Good | Very Good |
| 4 | Upper Curved Portion | | | 2 | 8 | 20 | Good | Very Good |
| 5 | Upper Curved Portion | | | 2 | 11 | 26 | Good | Very Good |
| 6 | Upper Curved Portion | | | 5 | 2 | 35 | Good | Very Good |
| 7 | Upper Curved Portion | | | 5 | 5 | 50 | Good | Very Good |
| 8 | Upper Curved Portion | | | 5 | 8 | 65 | Good | Good |
| 9 | Upper Curved Portion | | | 5 | 11 | 80 | Good | Good |
| 10 | Upper Curved Portion | | | 8 | 2 | 80 | Good | Good |
| 11 | Upper Curved Portion | | | 8 | 5 | 104 | Good | Good |
| 12 | Upper Curved Portion | | | 8 | 8 | 128 | Good | Not Good |
| 13 | Upper Curved Portion | | | 8 | 11 | 152 | Good | Not Good |
| 14 | A | B | C | 50 | 20 | 3500 | Not Good | Good |
| 15 | Lower Curved Portion | | Upper Curved Portion | 65 | 10 | 4875 | Good | Not Good |

As shown in Table 1, in the wound electrode bodies according to Examples 1 to 11, a step difference was not formed on the flat surfaces of the wound electrode body. In of the separators and reaches the positive electrode active material layer, small short-circuiting may occur. Therefore, it was found that, from the viewpoint of exhibiting the effect of suppressing small short-circuiting at a high level, it is more preferable that the relationship a×(a+b) between the distance a (mm) and the distance b (mm) is 50 or less.

Hereinabove, the specific examples of the invention have been described in detail. However, the embodiment and the examples are merely exemplary and do not limit the claims. The technique described in the claims includes various modifications and alternations of the above-described specific examples.

What is claimed is:

1. A nonaqueous electrolyte secondary battery comprising a wound electrode body, wherein
   the wound electrode body is a flat wound electrode body that is obtained by laminating an elongated positive electrode and an elongated negative electrode with two elongated separators interposed between the elongated positive electrode and the elongated negative electrode to obtain a laminate and winding the laminate,
   the positive electrode includes a positive electrode active material layer on a positive electrode current collector,
   the negative electrode includes a negative electrode active material layer on a negative electrode current collector,
   the positive electrode active material layer is formed on each of both surfaces of the positive electrode current collector in a longitudinal direction so as to reach a positive electrode winding end which is a winding end of the elongated positive electrode constituting the wound electrode body, the positive electrode winding end being positioned outside the wound electrode body,
   the negative electrode active material layer is formed on each of both surfaces of the negative electrode current collector in a longitudinal direction so as to reach a negative electrode winding end which is a winding end of the elongated negative electrode constituting the wound electrode body, the negative electrode winding end being positioned outside the wound electrode body,
   the wound electrode body is formed such that the negative electrode is positioned on an outer circumference side of the wound electrode body compared to the positive electrode, and has two curved portions and a center flat portion,
   the two curved portions are both end portions in a direction perpendicular to a winding axis and in which an outer surface excluding a lamination surface of the wound electrode body is curved,
   the center flat portion is a center portion interposed between the curved portions and has two wide flat surfaces,
   the positive electrode winding end of the positive electrode, the negative electrode winding end of the negative electrode, and separator winding ends are arranged on the same curved portion to be positioned inside the two flat surfaces in a thickness direction of the wound electrode body, the separator winding ends being winding ends of the two separators constituting the wound electrode body, respectively, the separator winding ends being positioned outside the wound electrode body and
   the arrangement of the positive electrode winding end, the negative electrode winding end, and the two separator winding ends satisfies the following conditions:
   (i) the negative electrode winding end is arranged at a position where the negative electrode winding end is parallel to the positive electrode winding end, or at an advanced position from the positive electrode winding end in a winding direction; and
   (ii) at least one of the separator winding ends is positioned at an advanced position from the negative electrode winding end in the winding direction, and
   when a distance from the negative electrode winding end to one of the two separator winding ends which is arranged at a more advanced position in the winding direction is represented by a (mm), and when a distance from the positive electrode winding end to the negative electrode winding end is represented by b (mm), the distance a and the distance b satisfy relationships 0.5≤a×(a+b)≤104 and 0≤b≤11.

2. The nonaqueous electrolyte secondary battery according to claim 1, wherein
   the distance a (mm) and the distance b (mm) satisfy 0.5≤a≤8 and 0.5≤b≤11.

3. The nonaqueous electrolyte secondary battery according to claim 1, wherein
   the distance a (mm) and the distance b (mm) satisfy 0.5≤a×(a+b)≤50.

4. The nonaqueous electrolyte secondary battery according to claim 1, wherein
   the one of the two separator winding ends which is arranged at a more advanced position in the winding direction is fixed to an outer surface of the wound electrode body through a winding stopper, and
   both ends of the winding stopper in the winding direction are arranged on the same curved portion as the separator winding ends to be positioned inside the two flat surfaces in the thickness direction of the wound electrode body.

5. The nonaqueous electrolyte secondary battery according to claim 1, wherein
   the separator winding ends of the two separators are arranged at positions parallel to each other.

6. The nonaqueous electrolyte secondary battery according to claim 1, wherein
   the positive electrode active material layer contains, as a positive electrode active material, a lithium transition metal composite oxide containing at least one of manganese and nickel.

7. A battery pack in which plural single cells are electrically connected to each other, the battery pack comprising
   the nonaqueous electrolyte secondary battery according to claim 1 as each of the single cells, wherein
   the center flat portion of the wound electrode body included in the single cell is pressed at a pressure of 0.2 MPa to 10 MPa in a direction perpendicular to the flat surfaces of the center flat portion.

* * * * *